United States Patent [19]

Henquin et al.

[11] Patent Number: 4,506,359
[45] Date of Patent: Mar. 19, 1985

[54] TASI APPARATUS FOR USE WITH SYSTEMS HAVING INTERREGISTER MULTIFREQUENCY SIGNALLING

[75] Inventors: Teodor Henquin, Kiron; Ya'acov B. Zeev, Ramat Gan, both of Israel

[73] Assignee: Electronics Corporation of Israel Ltd., Tel Aviv, Israel

[21] Appl. No.: 410,596

[22] Filed: Aug. 23, 1982

[30] Foreign Application Priority Data

Sep. 1, 1981 [IL] Israel .......................................... 63707

[51] Int. Cl.³ .............................................. H04J 3/16
[52] U.S. Cl. ..................................... 370/81; 370/110.1
[58] Field of Search ......................... 370/80, 81, 110.1

[56] References Cited

U.S. PATENT DOCUMENTS

| | | | |
|---|---|---|---|
| 3,046,347 | 7/1962 | Miedema | 370/81 |
| 3,721,767 | 3/1973 | LaMarche et al. | 370/81 |
| 4,153,816 | 5/1979 | Morgan | 370/81 |

FOREIGN PATENT DOCUMENTS 0049568  4/1982  European Pat. Off. .............. 370/81

Primary Examiner—Douglas W. Olms
Assistant Examiner—Frank M. Scutch, III
Attorney, Agent, or Firm—Browdy and Neimark

[57] ABSTRACT

TASI apparatus suitable for use with telephone networks employing interregister multifrequency signalling comprising transmission apparatus at a first end of a transmission trunk link having a first plurality of communication channels, the transmission apparatus including means for detecting signals on a second plurality of telephone communication lines on which signals are present to an available one of the first plurality of communication channels and means for applying a delay to the detected signals, receiving apparatus at a second end of the transmission link including means for assigning each of the first plurality of communication channels carrying signals to a corresponding one of the second plurality of telephone communication lines in accordance with assignment information received from the transmission apparatus, means for communicating messages including assignment information between the transmission apparatus and the receiving apparatus, means for sensing the onset of interregister multifrequency signalling on the second plurality of telephone communication lines, and means for disabling the means for applying a delay to the detected signals in response to the sensed onset of interregister multifrequency signalling.

15 Claims, 40 Drawing Figures

TRUNK J OUTGOING

TRUNK J INCOMING

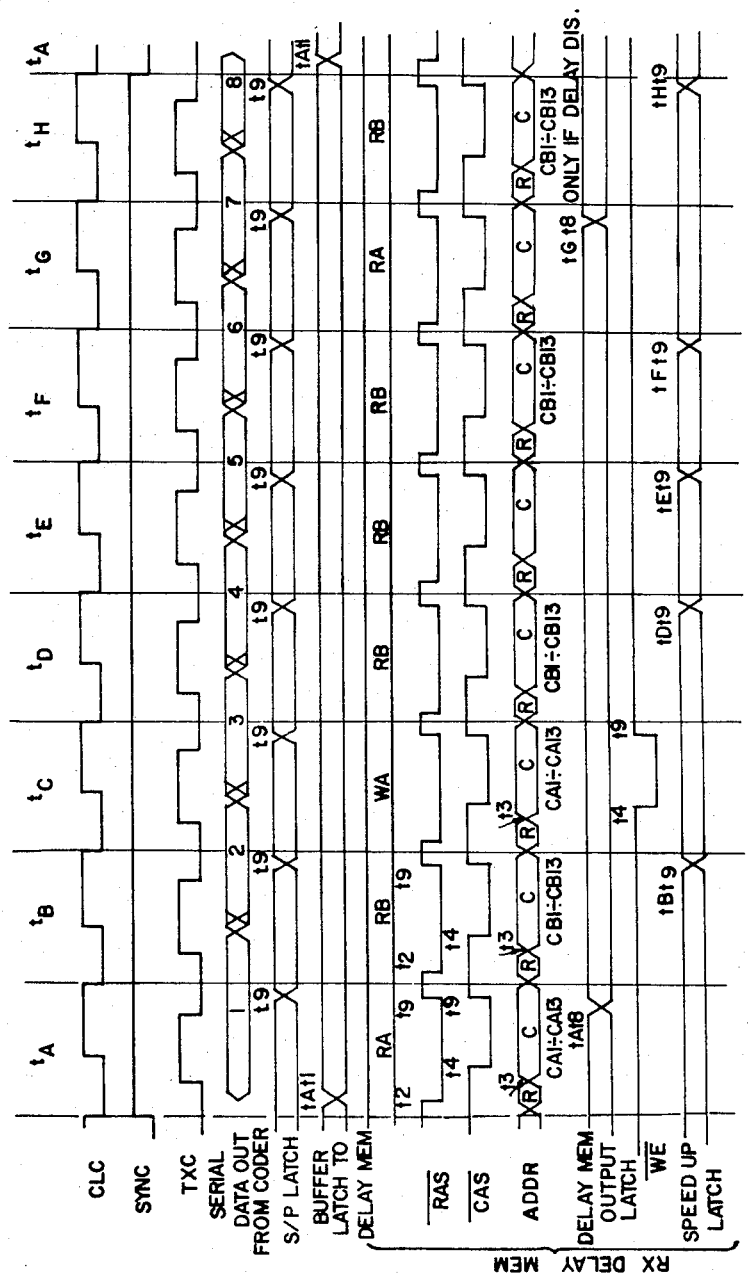
FIG. 4a  SERIAL TO PAR. CONV. & DELAY MEMORY

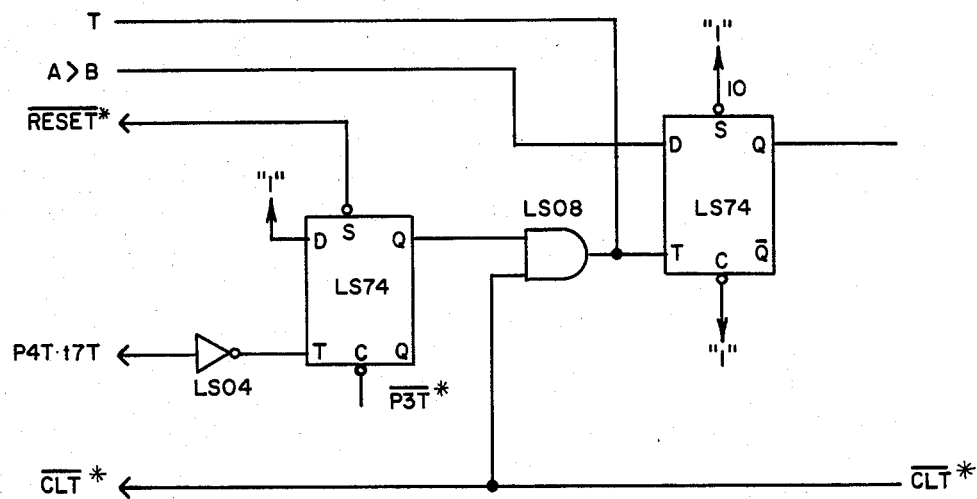
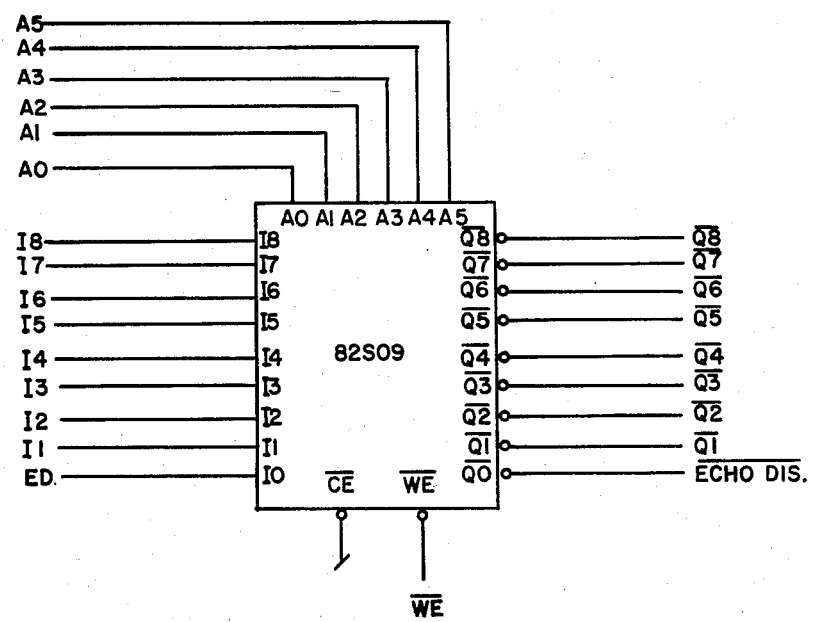
FIG. 5d

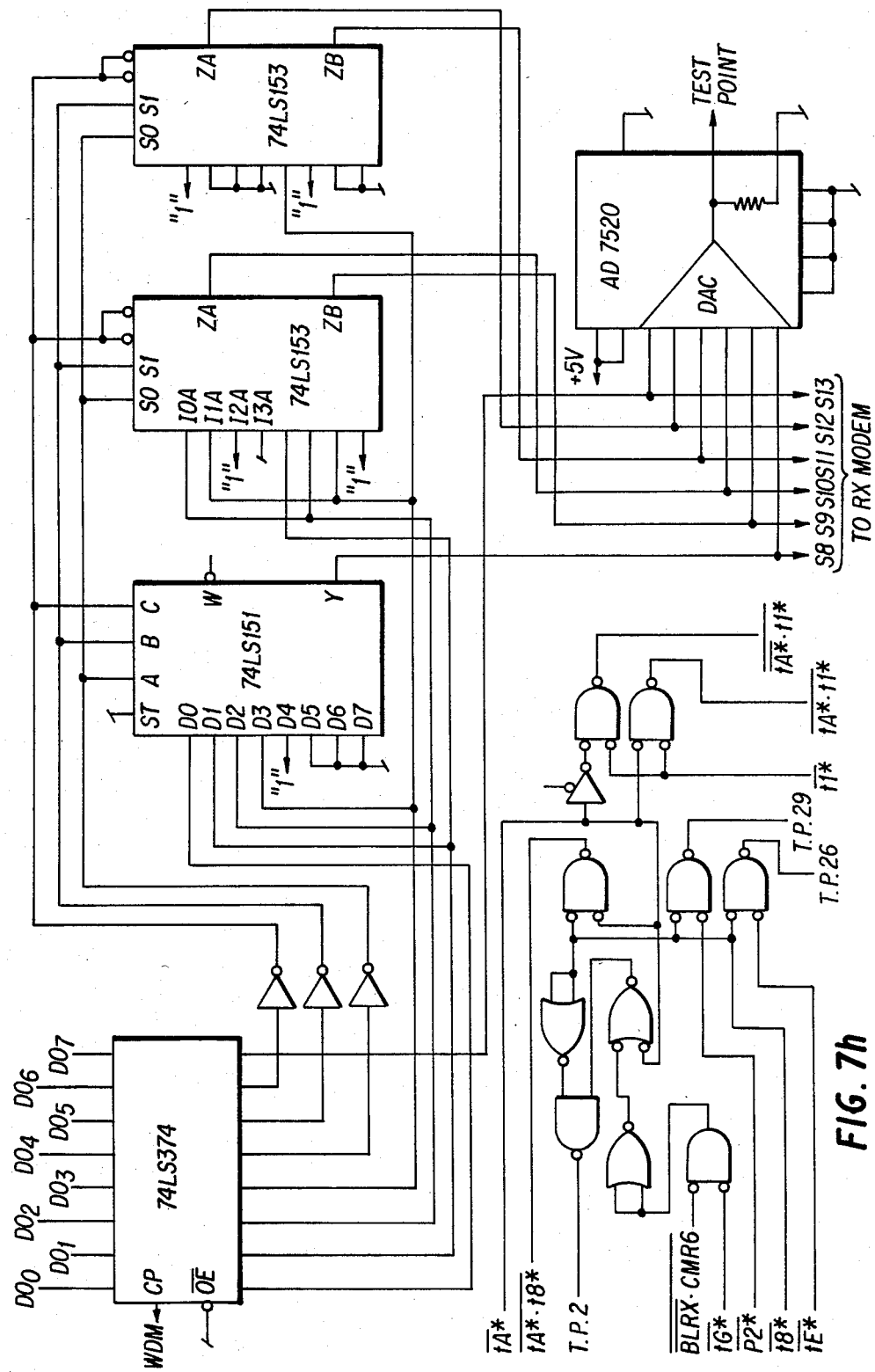

TASI APPARATUS FOR USE WITH SYSTEMS HAVING INTERREGISTER MULTIFREQUENCY SIGNALLING

FIELD OF THE INVENTION

The present invention relates to telecommunications apparatus generally and more particularly to time assignment speech interpolation apparatus

BACKGROUND OF THE INVENTION

Time Assignment Speech interpolation (TASI) communication systems have been known for approximately twenty years. Their function, stated in general terms, is to exploit the fact that during a normal telephone conversation, information is being transmitted only about 35% of the time. TASI communication systems serve to connect a speaker to a transmission line only during those portions of a conversation when speech is actually present. During the other portions of the conversation, the transmission line is connected to another speaker, currently speaking in another conversation. By using time assignment speech interpolation, a given number of transmission lines, such as 24, can usually carry about 48 simultaneous conversations.

A particularly effective TASI system which has met with commercial success is currently manufactured by Electronics Corporation of Israel Ltd. and is described in Published European Patent Application No. 0025465 of Mar. 25, 1981 corresponding to application No. 79301917.5.

All known TASI systems, including that manufactured by Electronics Corporation of Israel Ltd. cannot presently be used in telephone networks having fully compelled interregister multifrequency signalling.

Interregister multi frequency signalling is known as System R-2 line signalling in the CCITT standards and Socotel in the French system. The R 2 system operation is described in detail in Volume VI.3 of the CCITT standards, Orange Book, Section 2, Recommendations Q 411–Q 416, the contents of which are incorporated herein by reference as background source material. Briefly described, the R 2 system involves an in-band multifrequency code with forward and backward fully compelled signalling, for call set up control signals, i.e. interregister signalling. Line signalling is provided by out of band signalling such as E and M wire signalling and only indicates the change of states from one signalling state to another. For example, the transition from the "idle" state to the "seized" state is indicated by an out of band transition from TONE-OFF on the outgoing line and an unchanged TONE-ON status on the incoming line.

A number of functions of time assignment speech interpolation systems, such as the ECI system, are incompatible with interregister multifrequency signalling. The use of an Echo Suppressor during signalling has been found by applicants to at least partially block the interregister signalling due to the simultaneous presence of signals in both directions. Applicants have also been found that the provision of a 6 db attenuation as part of the echo suppression in the receiver interferes with signalling receipt in the R-2 signalling protocol.

Applicants have also found that the delay employed in TASI apparatus acts to extend the time-out period assigned to fully compelled interregister multifrequency signalling in the R-2 protocol.

SUMMARY OF THE INVENTION

The present invention seeks to provide apparatus for use with a TASI system for enabling it to function in a telephone network employing fully compelled interregister multifrequency signalling such as R-2.

There is thus provided in accordance with an embodiment of the present invention TASI apparatus suitable for use with telephone networks employing interregister multifrequency signalling comprising:

transmission apparatus at a first end of a transmission trunk link having a first plurality of communication channels, the transmission apparatus including apparatus for detecting signals on a second plurality of telephone communication lines and for assigning each telephone communication line on whch signals are present to an available one of the first plurality of communication channels and apparatus for applying a delay to the detected signals;

receiving apparatus at a second end of the transmission link including apparatus for assigning each of the first plurality of communication channels carrying signals to a corresponding one of the second plurality of telephone communication lines in accordance with assignment information received from the transmission apparatus, echo suppression apparatus, attenuation apparatus and apparatus for applying a delay to the received signals;

apparatus for communicating messages including assignment information between the transmission apparatus and the receiving apparatus;

apparatus for sensing the onset of interregister multifrequency signalling on the second plurality of telephone communication lines; and apparatus for disabling at least one of following in response to the sensed onset of interregister multifrequency signalling: the apparatus for applying a delay to the detected signals, the echo suppression apparatus, the attenuation apparatus and the apparatus for applying a delay to the received signals.

Further in accordance with an embodiment of the present invention, the apparatus for disabling is operative in response to the sensed onset of interregister multifrequency signalling to disable all of the following apparatus for the duration of the multifrequency signalling: apparatus for applying a delay to the detected signals, the echo suppression apparatus, the attenuation apparatus and the apparatus for applying a delay to the received signals.

Additionally in accordance with an embodiment of the present invention there is provided for use with a TASI system including transmission, receiving and communicating apparatus as described hereinabove, apparatus for enabling TASI operation in a network employing interregister multifrequency signalling comprising:

apparatus for communicating messages including assignment information between the transmission apparatus and the receiving apparatus;

apparatus for sensing the onset of interregister multifrequency signalling on the second plurality of telephone communication lines; and apparatus for disabling at least one or all of the following apparati in response to the sensed onset of interregister multifrequency signalling: apparatus for applying a delay to the detected signals, echo suppression apparatus, attenuation apparatus and apparatus for applying a delay to the received signals.

BRIEF DESCRIPTION OF THE DRAWINGS

The present invention will be more fully understood and appreciated from the following detailed description taken in conjunction with the drawings in which:

FIGS. 4a and 4b are a timing diagram illustrating timing for the receive speech flow circuitry of FIGS. 3a and 3b;

FIGS. 5A through 5K are schematic illustration of echo suppression circuitry forming part of the apparatus of FIGS. 1a and 1b;

FIGS. 6A through 6M are schematic illustration of transmit speech flow circuitry illustrated in block diagram form in FIGS. 2a and 2b; and FIGS. 7A through 7H are schematic illustration of receive speech flow circuitry illustrated in block diagram form in

DETAILED DESCRIPTION OF THE INVENTION

Figure 1A:
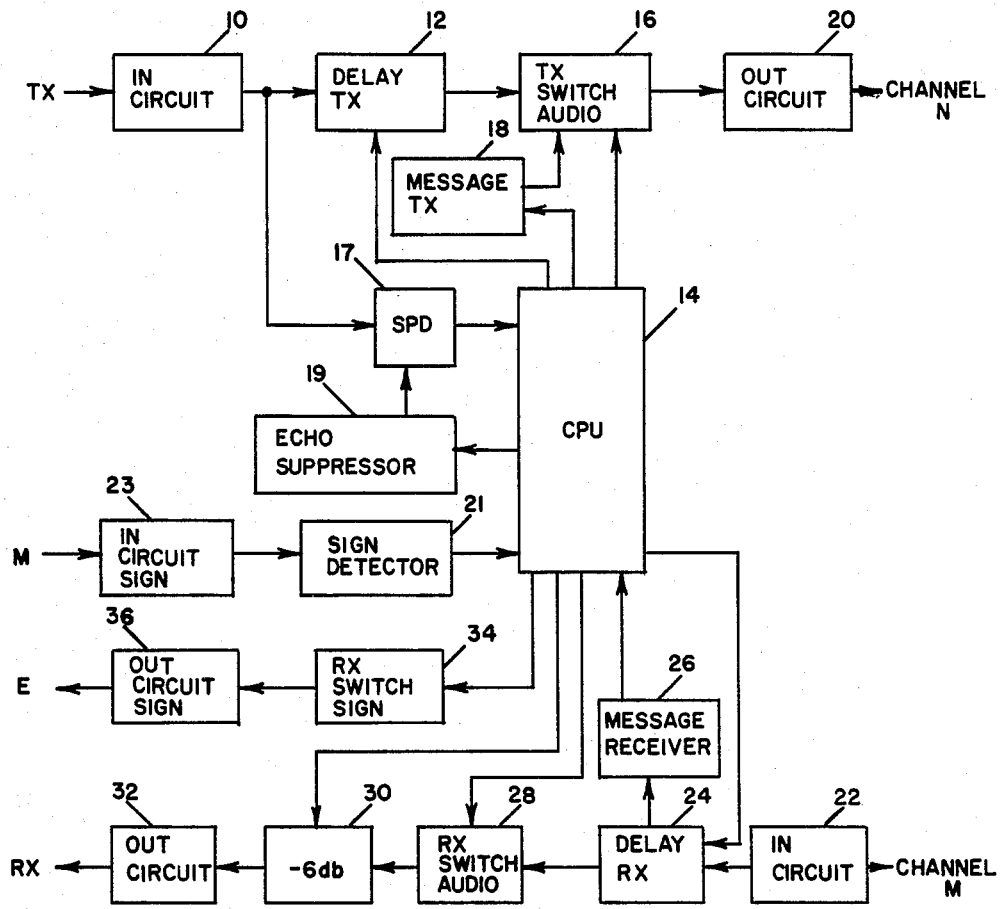
FIGS. 1a and 1b are block diagram illustrations of time assignment speech interpolation apparatus constructed and operative in accordance with a preferred embodiment of the present invention.

Reference is now made to FIG. 1 which illustrates TASI circuitry suitable for use in telephone networks having fully compelled interregister multifrequency signalling constructed and operative in accordance with an embodiment of the present invention. The apparatus of FIG. 1 comprises an input circuit 10, which may be similar to the circuitry illustrated in FIG. 2A of the above cited published European Patent Application. Circuit 10 receives inputs from telephone communications lines which are typically dedicated to outgoing calls. The output of circuit 10 is supplied to transmit speech flow circuitry 12, which receives an input from an CPU 14 and provides an output to a transmit audio switch 16. Circuitry 12 will be described in detail hereinafter in connection with FIG. 2. Audio switch 16 receives an input from a message transmit circuit 18, which also receives an input from CPU 14. The output of audio switch 16 is supplied via an output circuit 20 to an available one of the communication channels in accordance with general TASI principles.

The output of input circuit 10 is also supplied to speech detector circuitry 17 which receives an input from an echo suppressor 19. Both the echo suppressor and the speech detector interface with the CPU 14.

CPU 14 also receives an input from a signal detector 21, which in turn receives an input from the M signalling wire via an input circuit 23. Activity on the M signalling wire indicates initiation of a call.

Figure 3A:
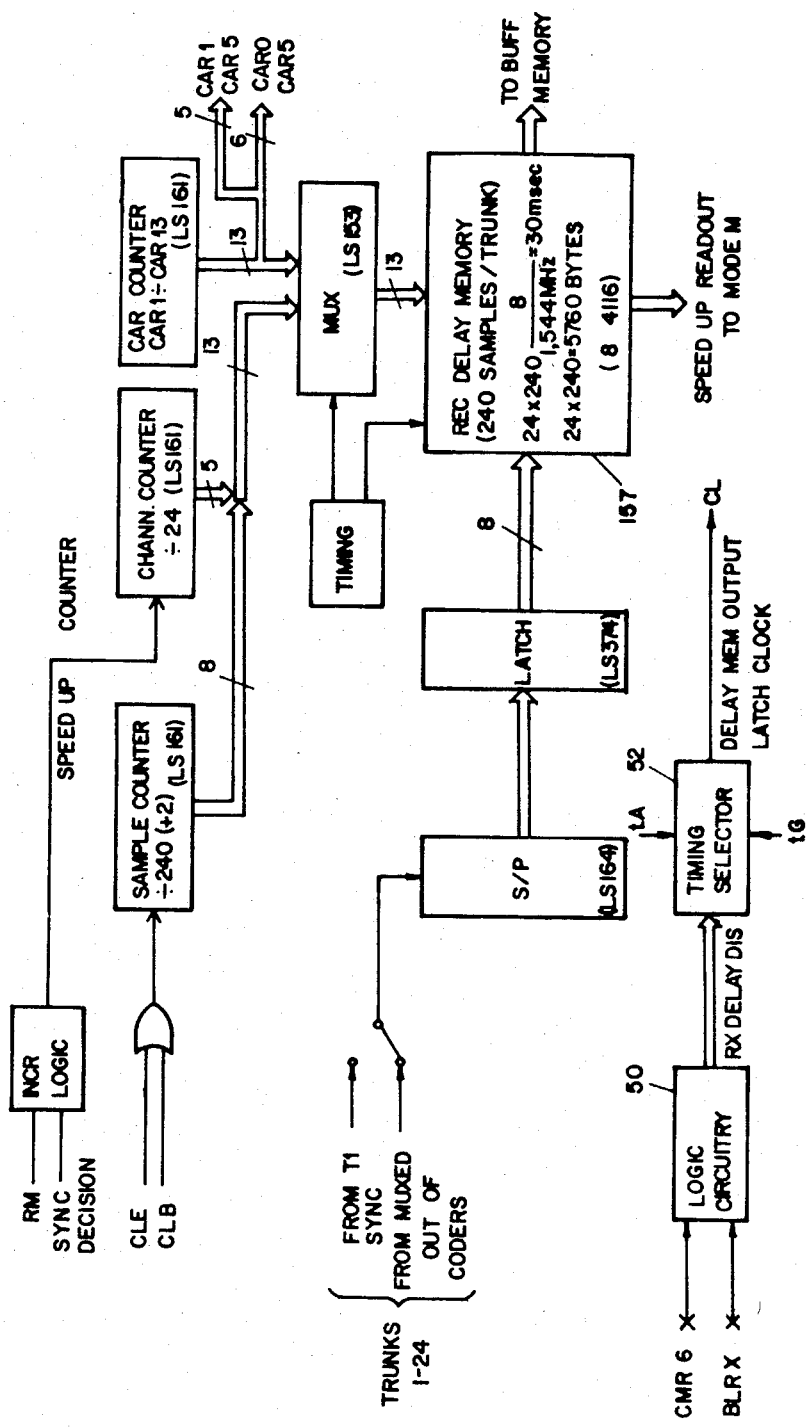
FIGS. 3a and 3b are block diagram illustrations of receive speech flow circuitry forming part of the circuitry of FIGS. 1a and 1b.
Figure 3B:
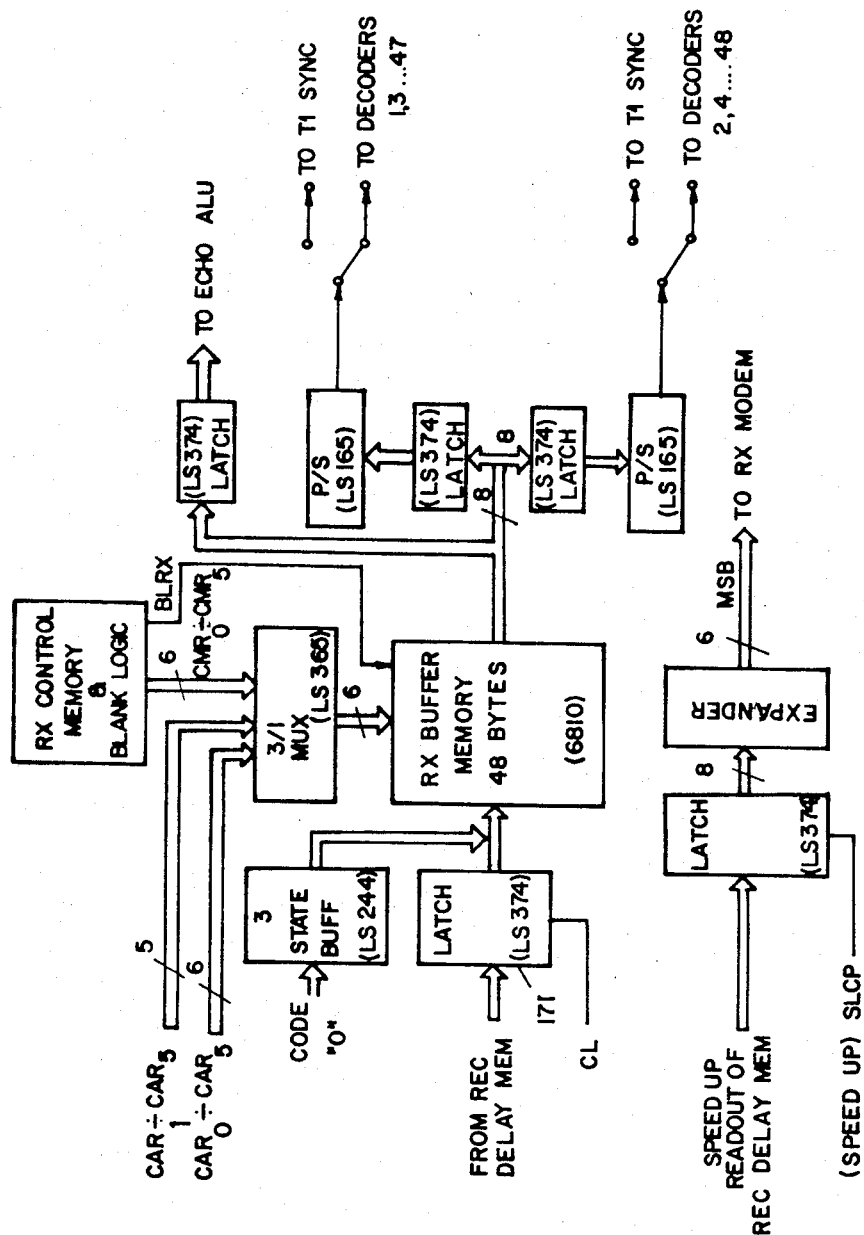

At a remote location, the communication channels are coupled to an input circuit 22, which outputs to a receive speech flow circuit 24 which receives an input from a CPU 15. Receive speech flow circuit 24 will be described in detail hereinafter in connection with FIG. 3. The output of circuit 24 is supplied to a message receiver circuit 26, which outputs to the CPU 15. The output of circuit 24 is also supplied to a receive audio switch 28, which outputs to a -6b attenuation circuit 30. The attenuated signal is supplied via an output circuit 32 to remote telephone communication lines which are typically dedicated to incoming calls.

CPU 15 also provides an enable output to attenuation circuit 30. Additionally CPU 15 provides an output to a receive signalling switch 34 which outputs to a signalling output circuit 36. The output of circuit 36 is coupled to the E signalling wire.

It is appreciated that the circuitry shown in FIG. 1 on opposite mutually remote sides of a communication trunk containing a plurality of communication channels is identical and symmetric. For that reason, the receive circuitry on the outgoing side of the circuitry will not be described, since it is identical to the receive circuitry described in connection with the incoming side. Correspondingly, the transmit circuitry on the incoming side will not be described since it is identical to the transmit circuitry described in connection with the outgoing side.

It is appreciated that although the detailed construction of the various circuits illustrated in block form are not essential for an understanding and full disclosure of the present invention, these circuits are all described in detail and illustrated fully in the aforesaid published European Patent Application, the disclosure of which is incorporated herein by reference as non-essential disclosure.

It is noted that although the present invention is being described herein with particular reference to the ECI TASI apparatus as described in the aforesaid published European Patent Application, the invention is not limited to use with TASI apparatus of this design and construction. The generality of the invention is sufficient to enable it to be used with any known type of TASI apparatus, provided that suitable variations are made in the circuitry described herein to adapt it to the particular application. These adaptations are believed to be well within the scope of a person ordinarily skilled in the art in view of the disclosure contained herein and of the published materials available to such a person.

In this connection it is noted that other types of TASI may not incorporate a receive delay and may employ echo suppression apparatus which is external to the TASI apparatus.

Reference is now made to FIG. 2 which illustrates in detailed block diagram illustration transmit speech flow circuitry 12. The circuitry of FIG. 2 is substantially identical in structure and function to that illustrated in FIG. 10 of the aforesaid European Patent Application and described therein, with the exception of the following portions which will now be described in detail.

A 2/1 multiplexer 40 receives a 6 bit CAT 0-CAT 5 input which is the output of a sequence counter. and also receives from the CPU data bus a DB 0=DB 5 address input. Multiplexer 40 is operative to provide a six-bit output to a 48×1 RAM 42 at an A0-A5 input. RAM also receives a delay enable signal from the CPU data bus. RAM 42 provides a transmit delay disable output to the enable input of a 2/1 multiplexer 44. Multiplexer 44 has two nine-bit inputs, one which is permanently set at zero for all bits and the other one which is coupled to the output of a 384 counter 46.

RAM 42 is operative to store a delay disable signal from the CPU bus for one or more specific telephone communication lines indicated by an address furnished by multiplexer 40. Each time that the transmit delay memory (125) of the transmit speech flow circuitry is sequenced to the channel or channels for which delay disable is indicated by the presence of a delay disable signal at multiplexer 44, the multiplexer reads into the delay memory all zeros such that the contents of the signal which are read into the delay memory are read into a location in the delay memory which is next immediately read out to latch (131), without being sequenced through 384 stages which produces the delay. It may thus be appreciated that when a delay disable signal is provided by the CPU, signals arriving on a communication line or lines for which delay disable is indicated are read out from the delay memory immediately after being written therein and without the predetermined delay that would otherwise be provided in the absence of such a delay disable signal.

Reference is now made to FIG. 3 which illustrates receive speech flow circuitry 24. The circuitry of FIG. 3 is substantially identical in structure and function to that illustrated in FIG. 12 of the aforesaid published European Patent Application and described therein, with the exception of the following portions which will now be described in detail.

Logic circuitry 50 receives the CMR 6 and BLRX timing signals respectively from a latch 99 and blank logic circuitry 97 forming part of receive control memory circuitry shown in FIG. 29b of the aforesaid Published European Patent Application 0025465 and provides an inverse receive delay disable signal to a timing selector 52. Timing selector 52 receives two timing signals, $t_A$ which is the normal timing signal for operation of a receive delay memory output latch (171) and $t_G$ which is a special timing signal employed in the presence of interregister multifrequency signalling. Timing selector 52 is operative in response to the signal received from logic circuitry 50 to determine whether to operate latch (171) on the basis of $t_A$ or $t_G$. The output timing signal, in either case, is applied as a latch clock signal to latch (171). Logic circuitry 50 is operative to cause timing selector 52 to apply the $t_G$ timing signal to latch (171) when interregister multifrequency signalling has been indicated for a given channel at a given time. In such a case, the $t_G$ timing is operative to provide an extra clock pulse to latch (171) immediately following read in of information from that channel into the delay memory (157). In such a way, the information from that channel is passed to the latch with substantially no delay.

Figure 4B:
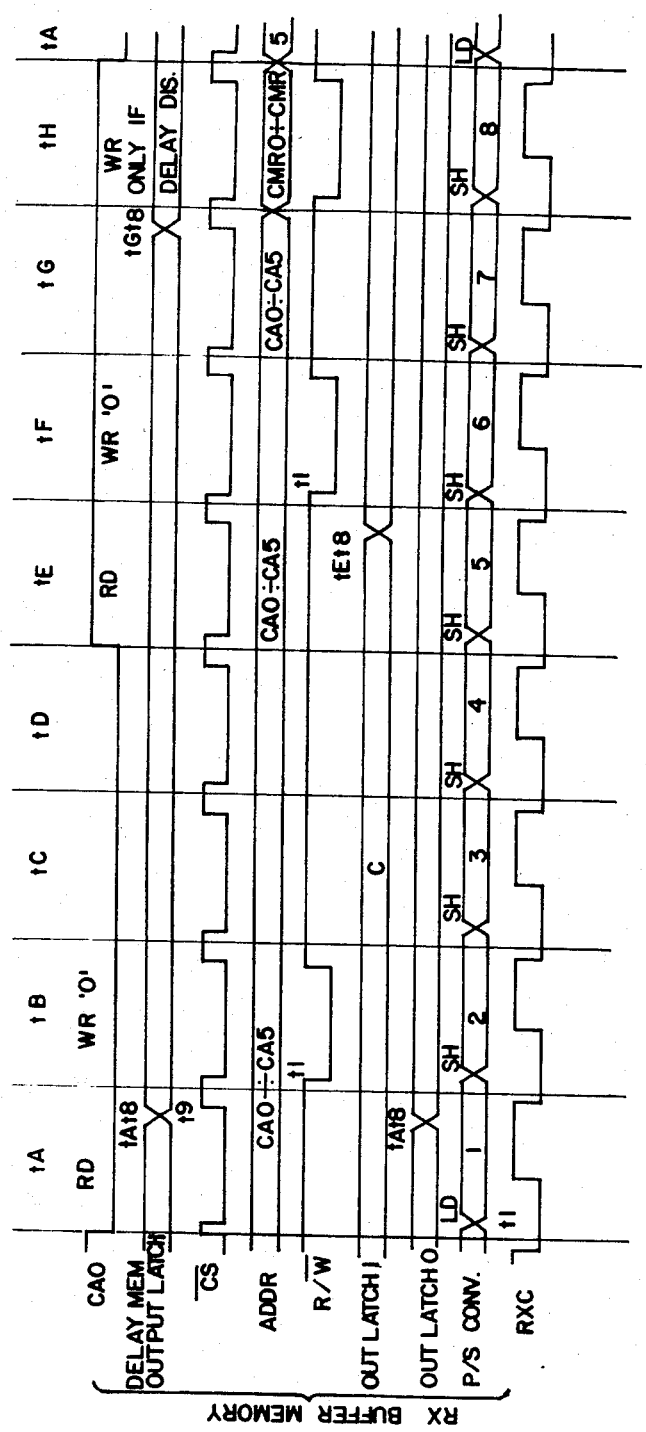
Figure 5A:
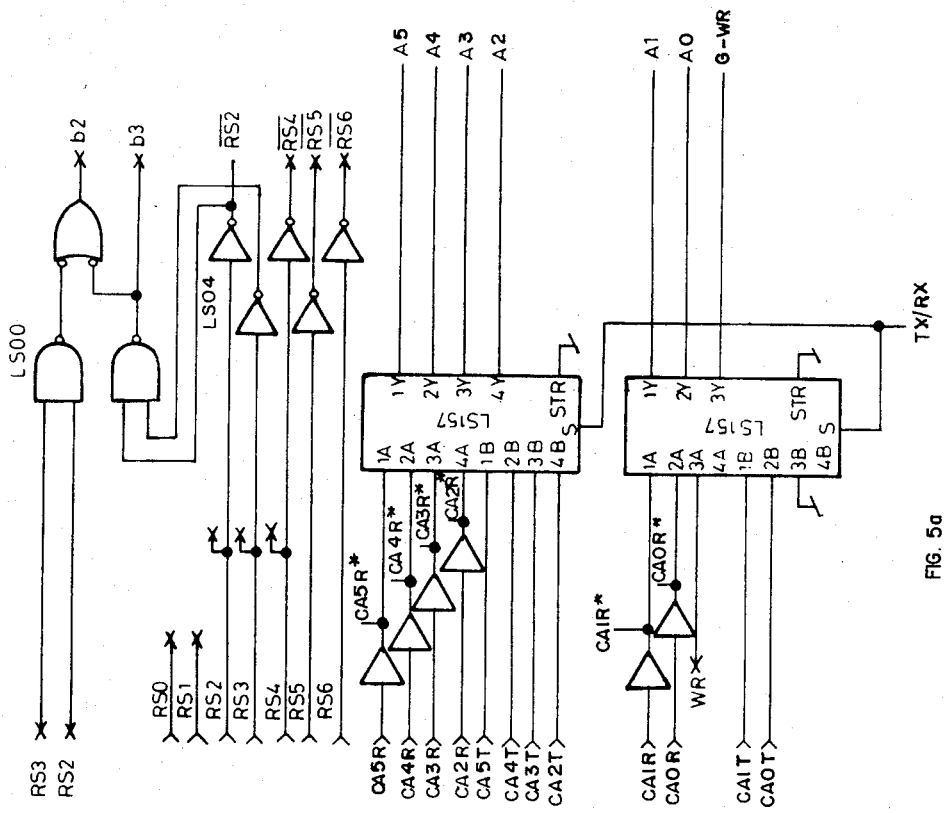
Figure 5B:
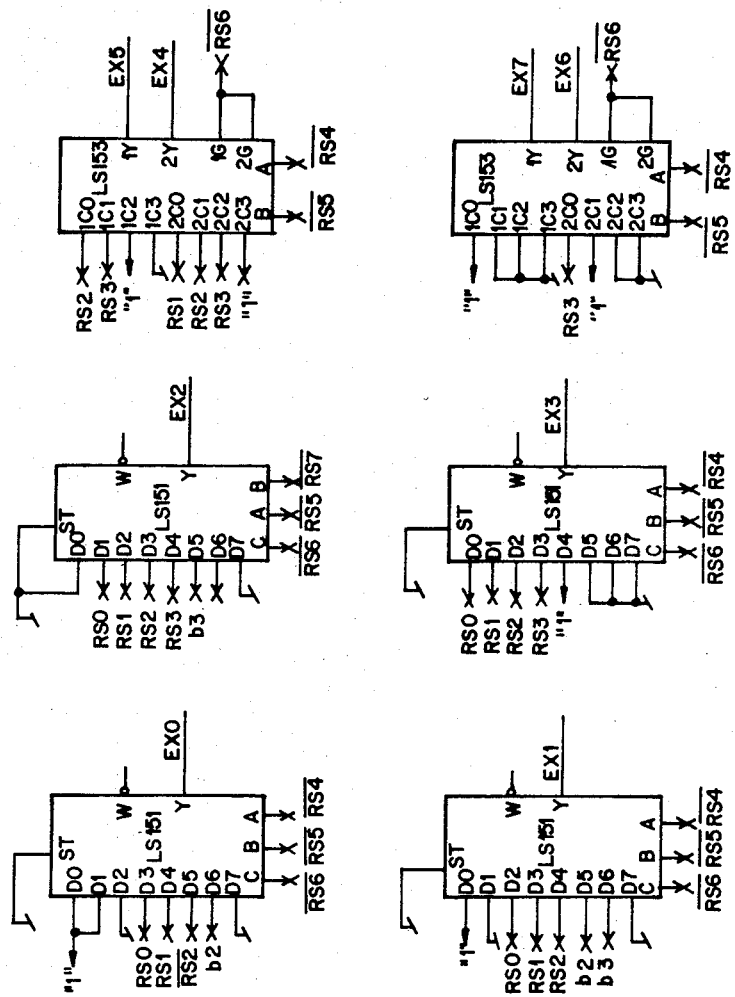
Figure 5C:
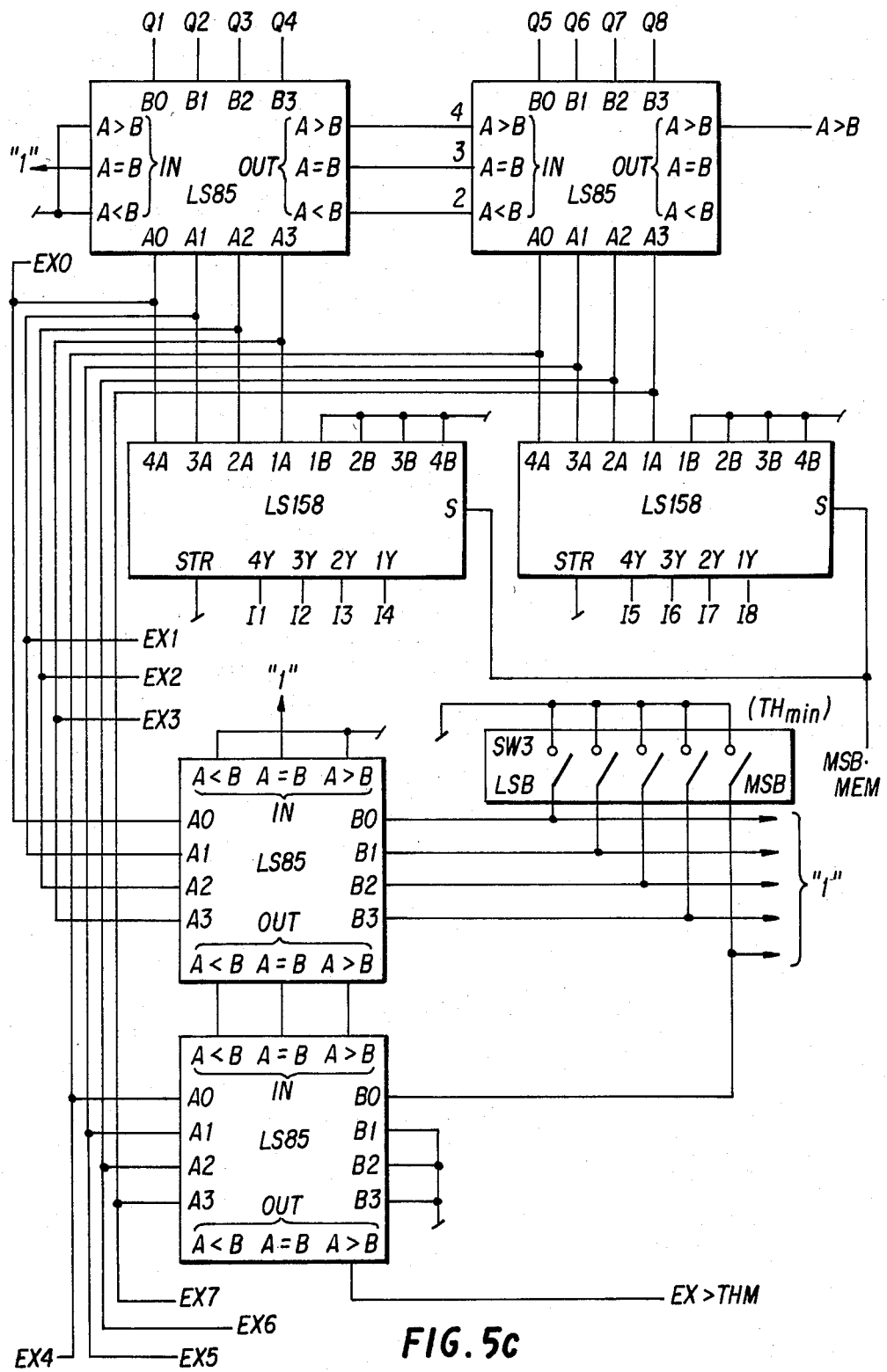
Figure 5E:
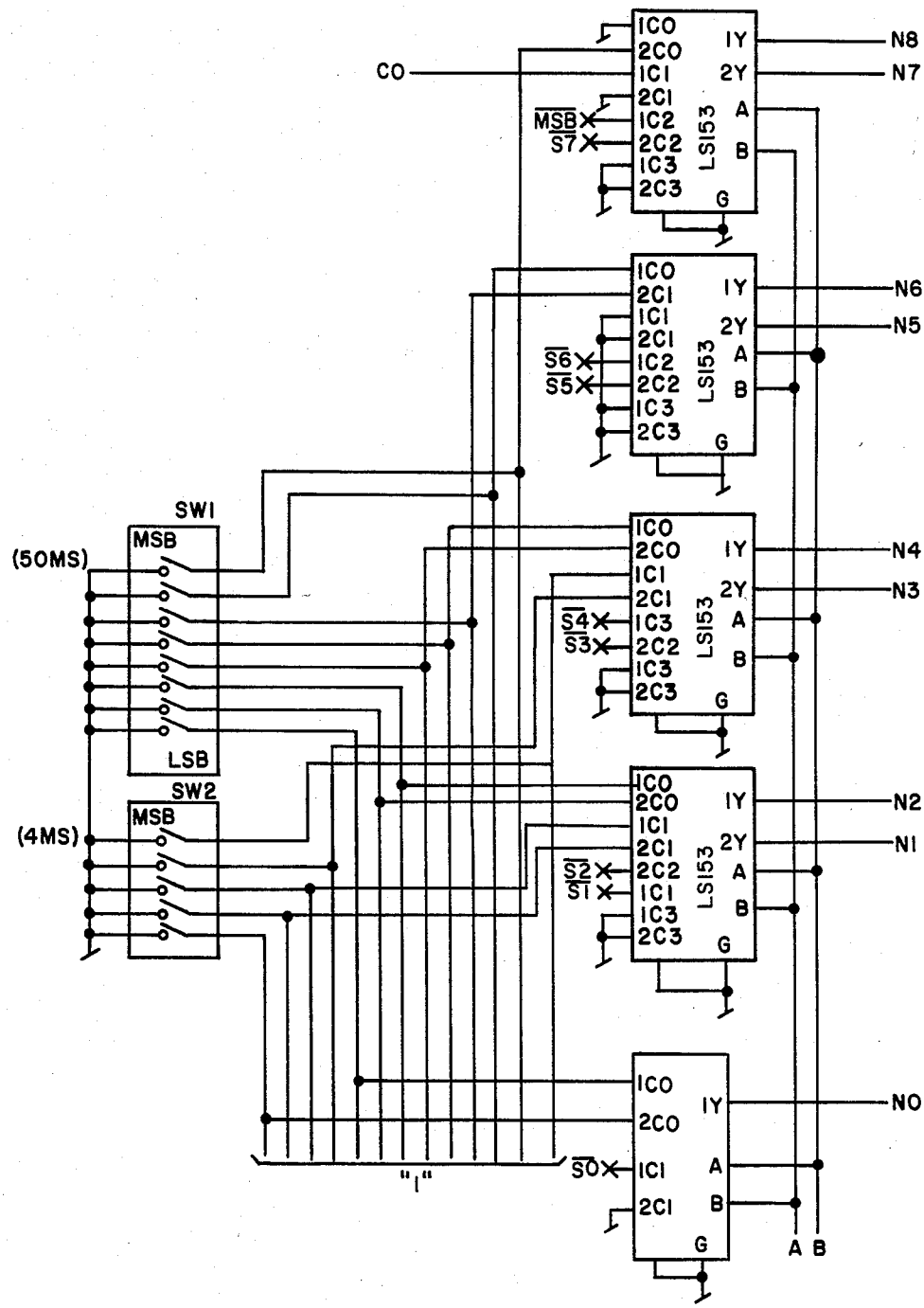
Figure 5F:
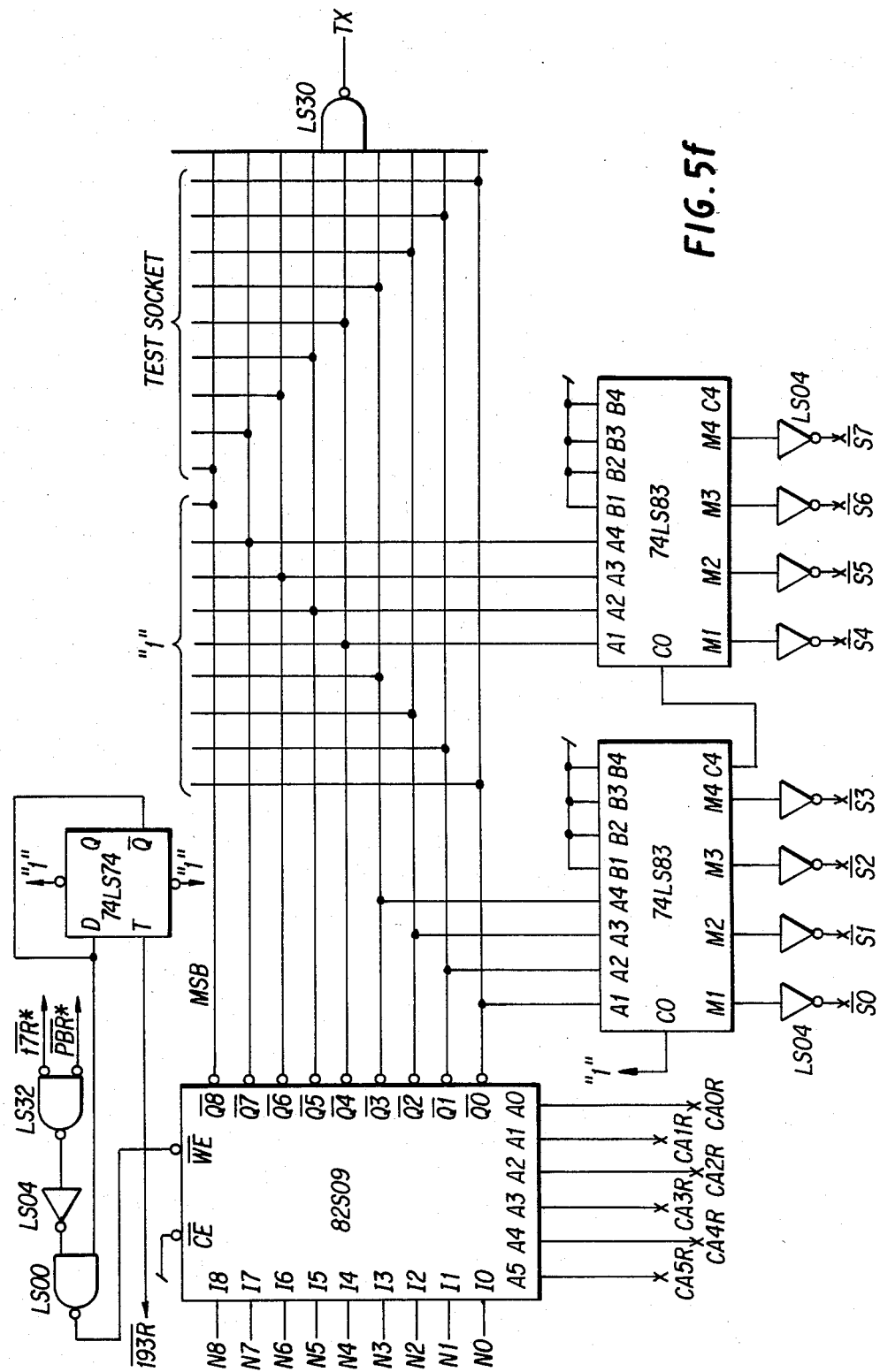
Figure 5G:
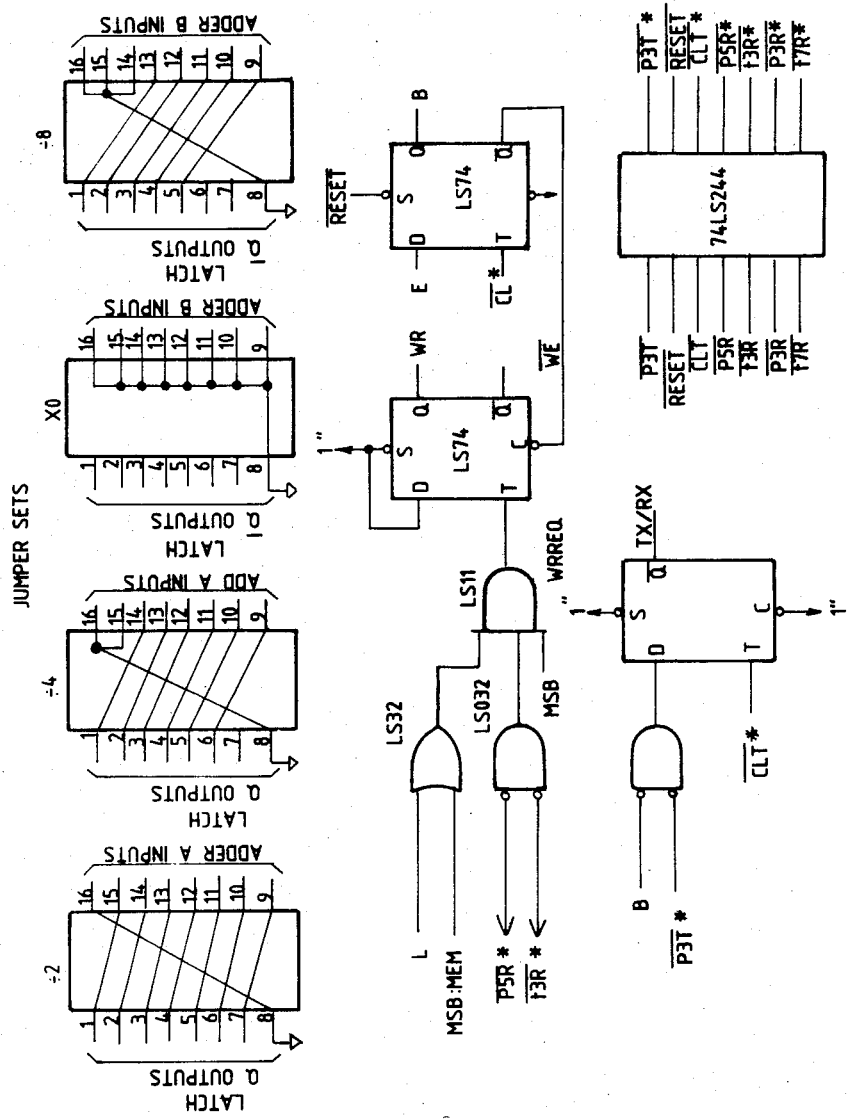
Figure 5H:
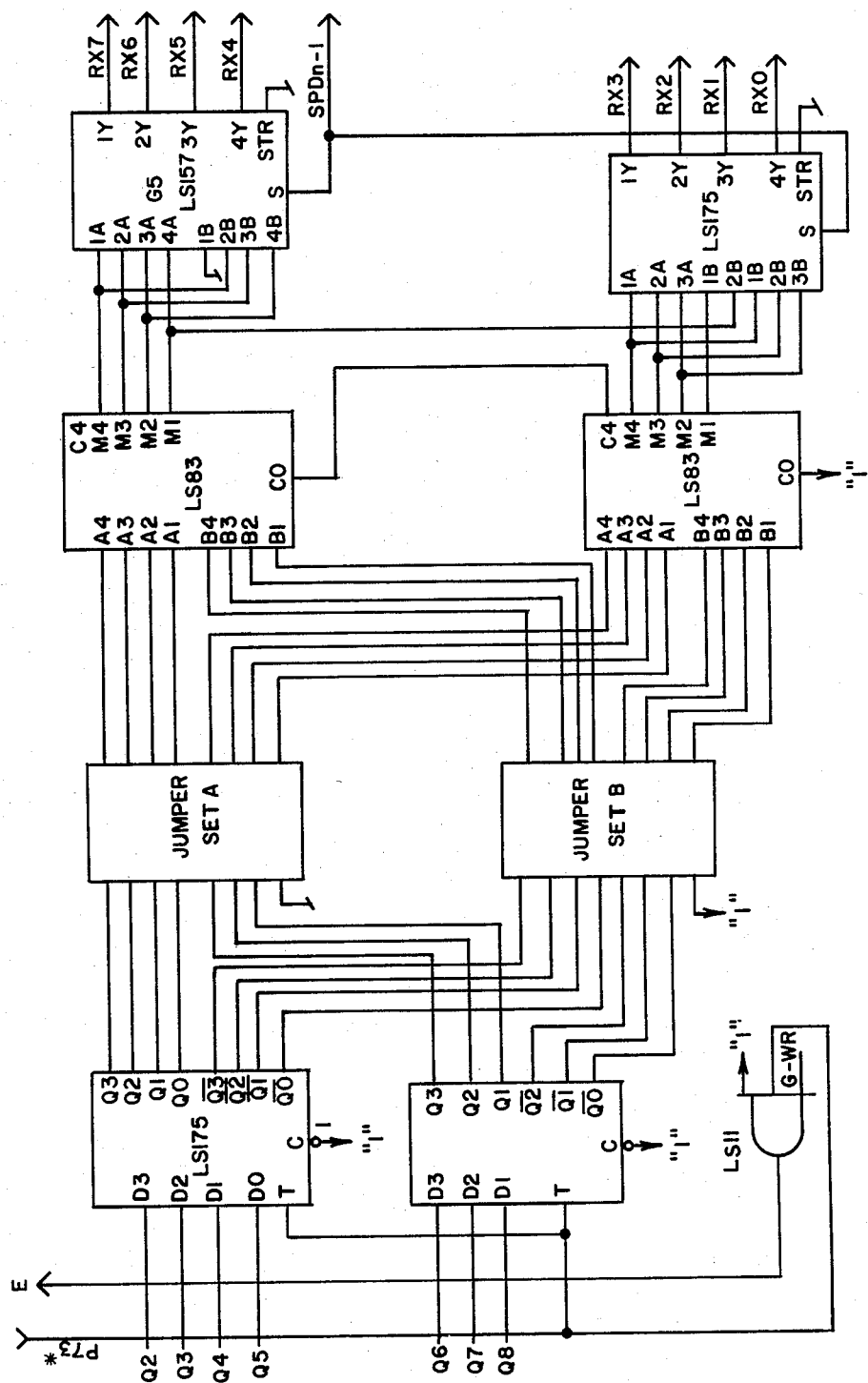
Figure 5I:
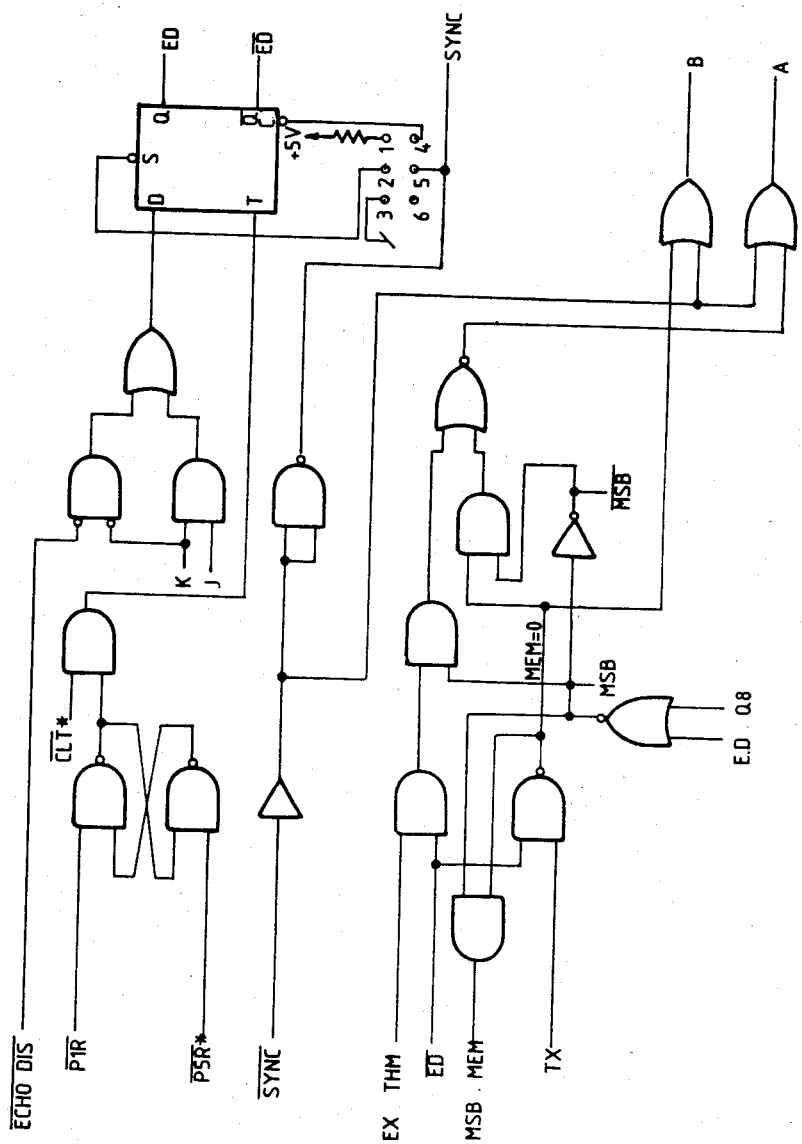
Figure 5J:
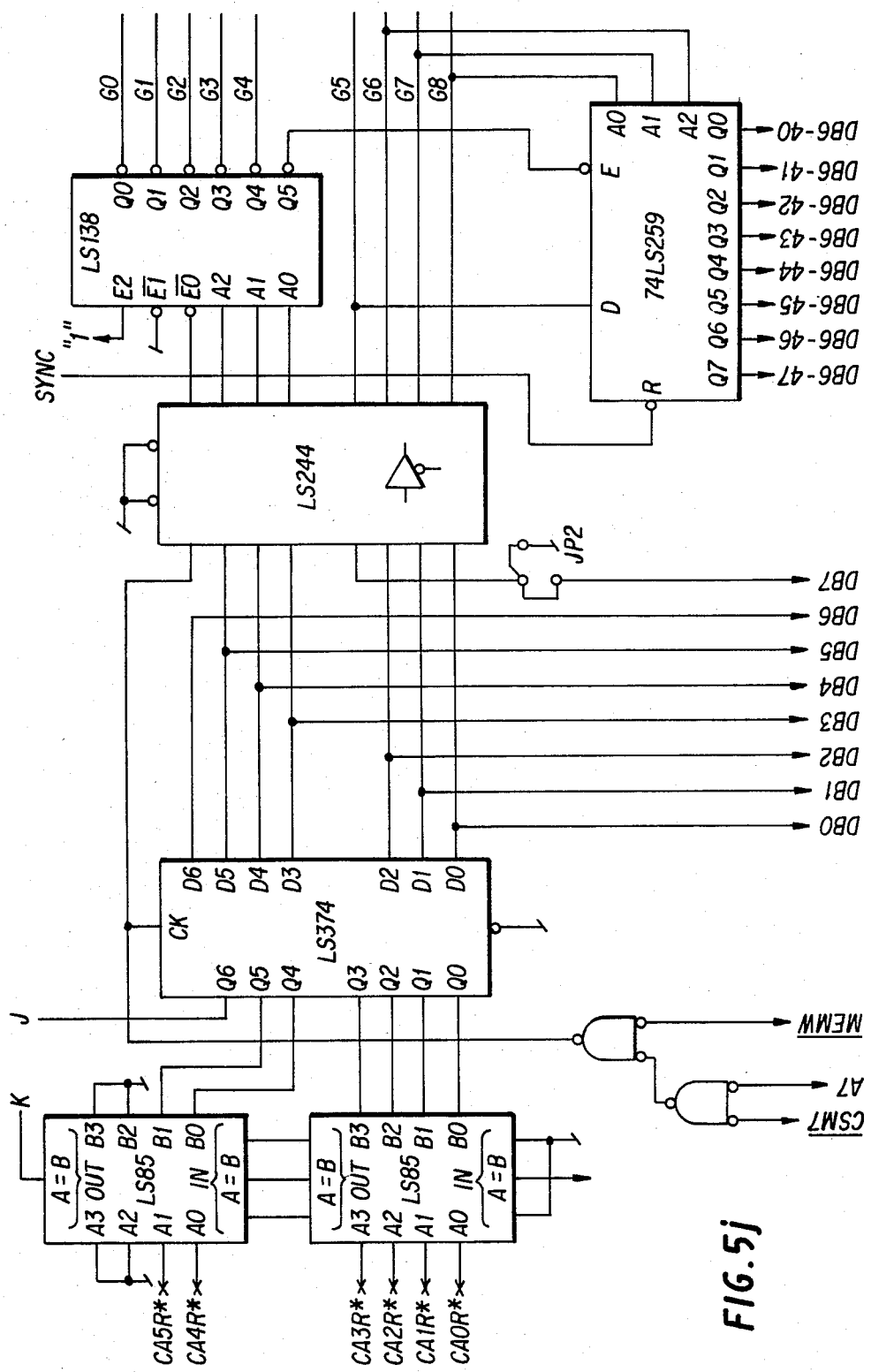
Figure 5K:
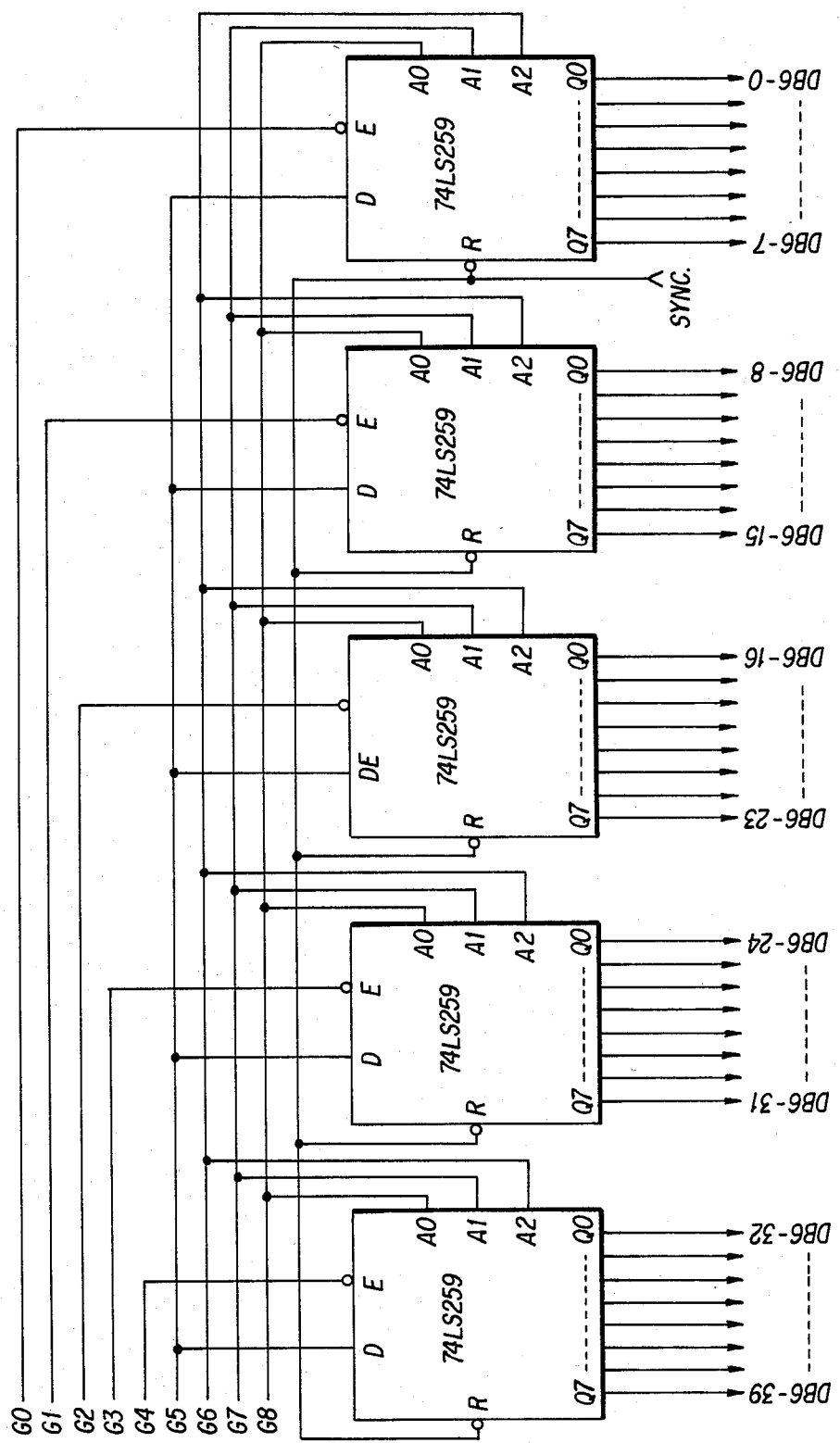
Figure 6A:
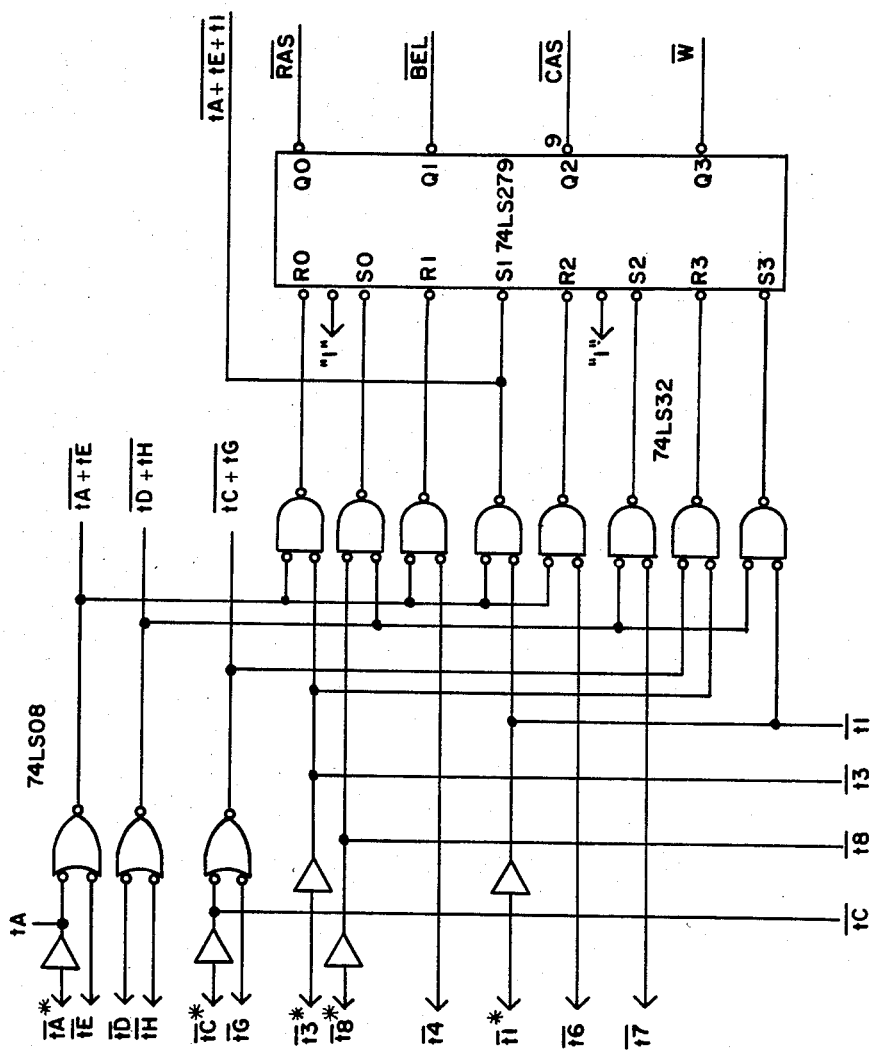
Figure 6B:
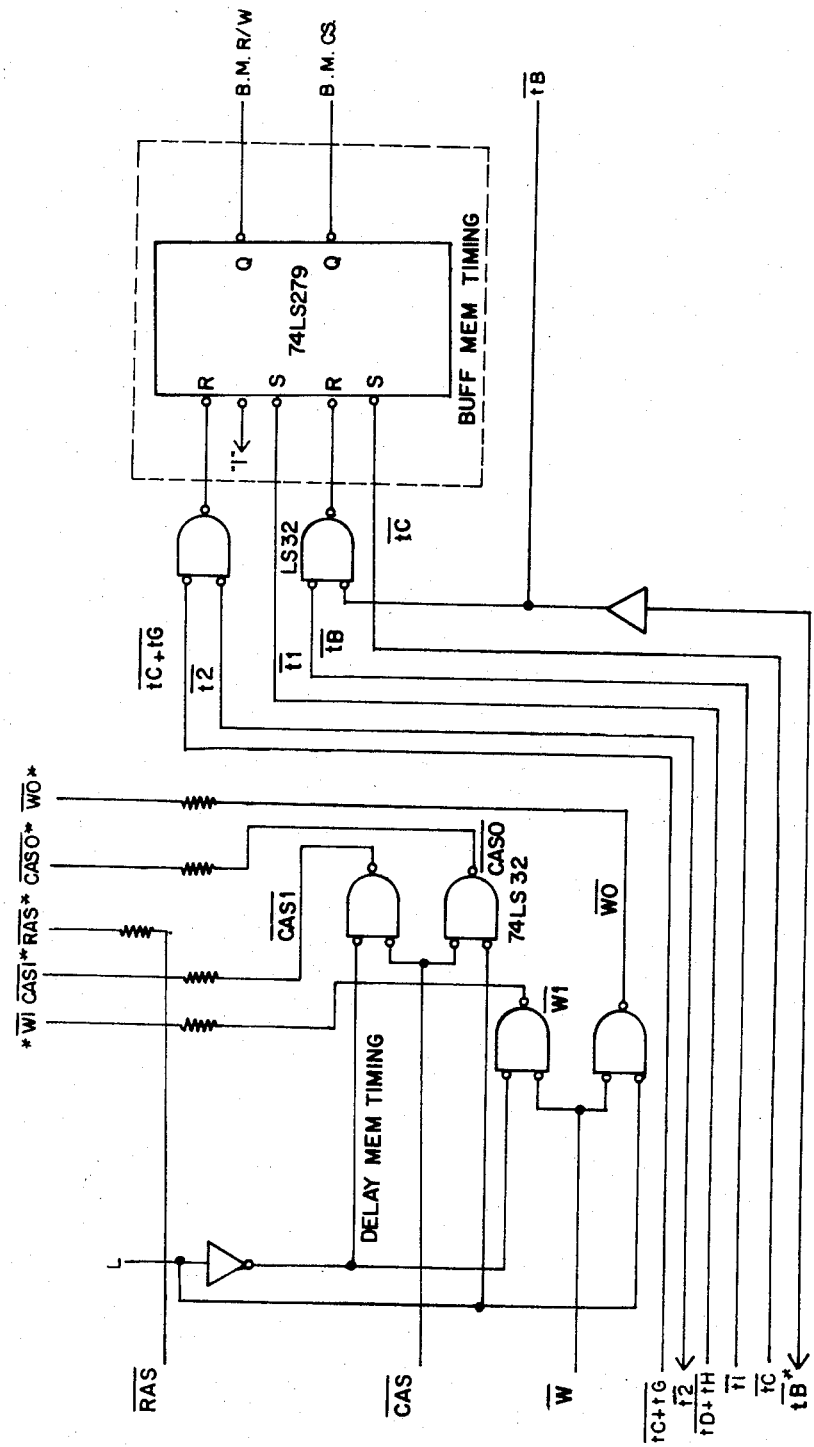
Figure 6C:
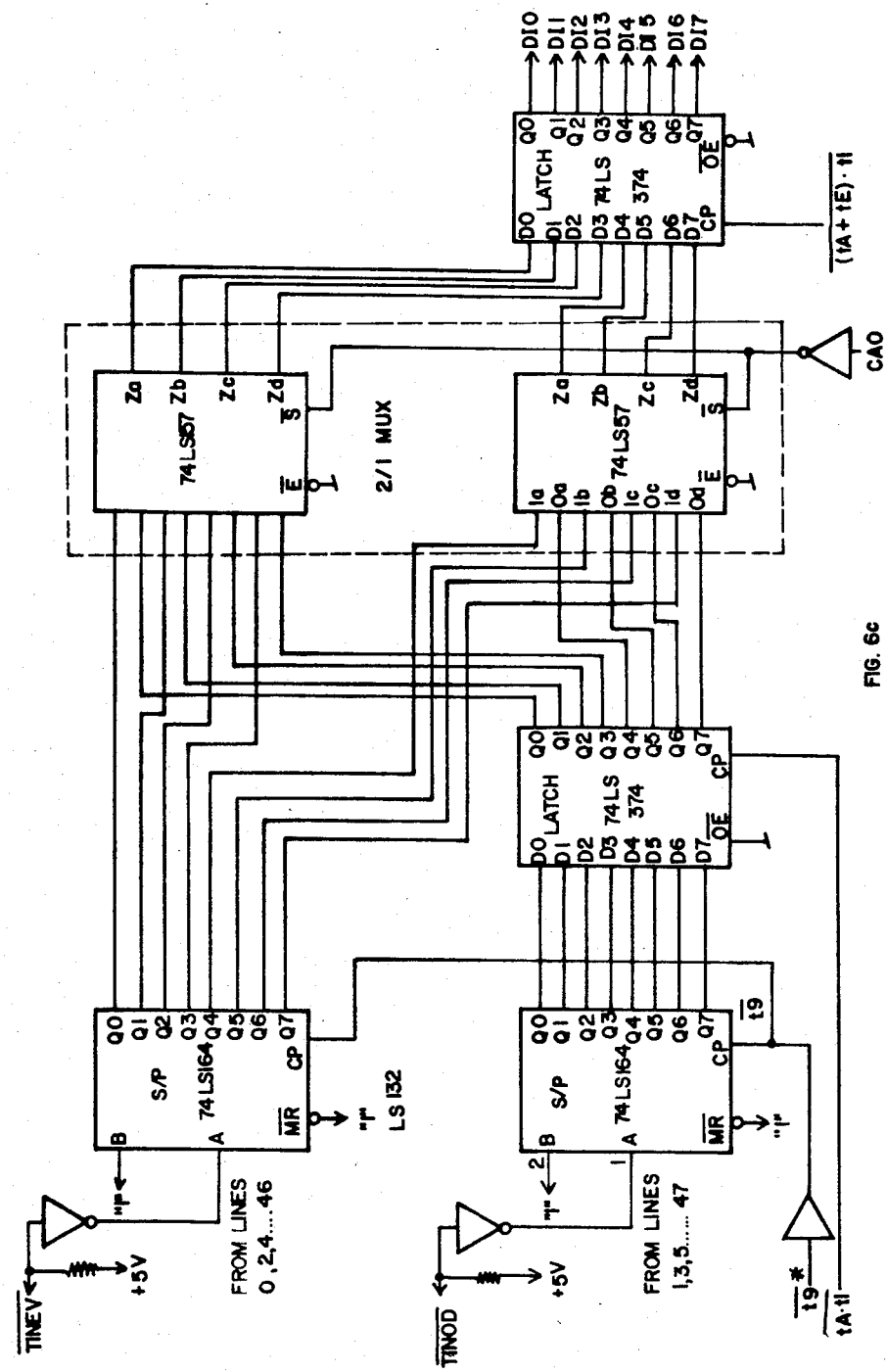
Figure 6D:
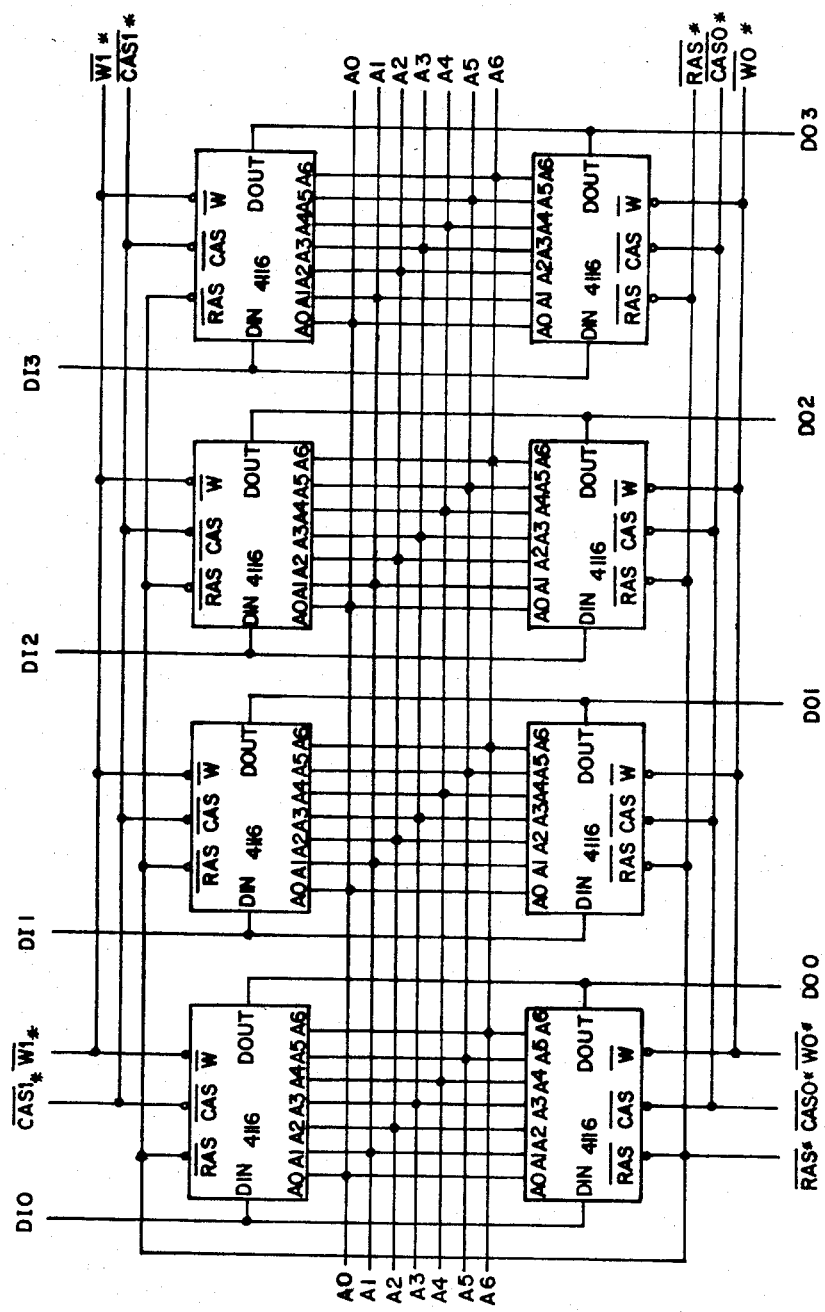
Figure 6E:
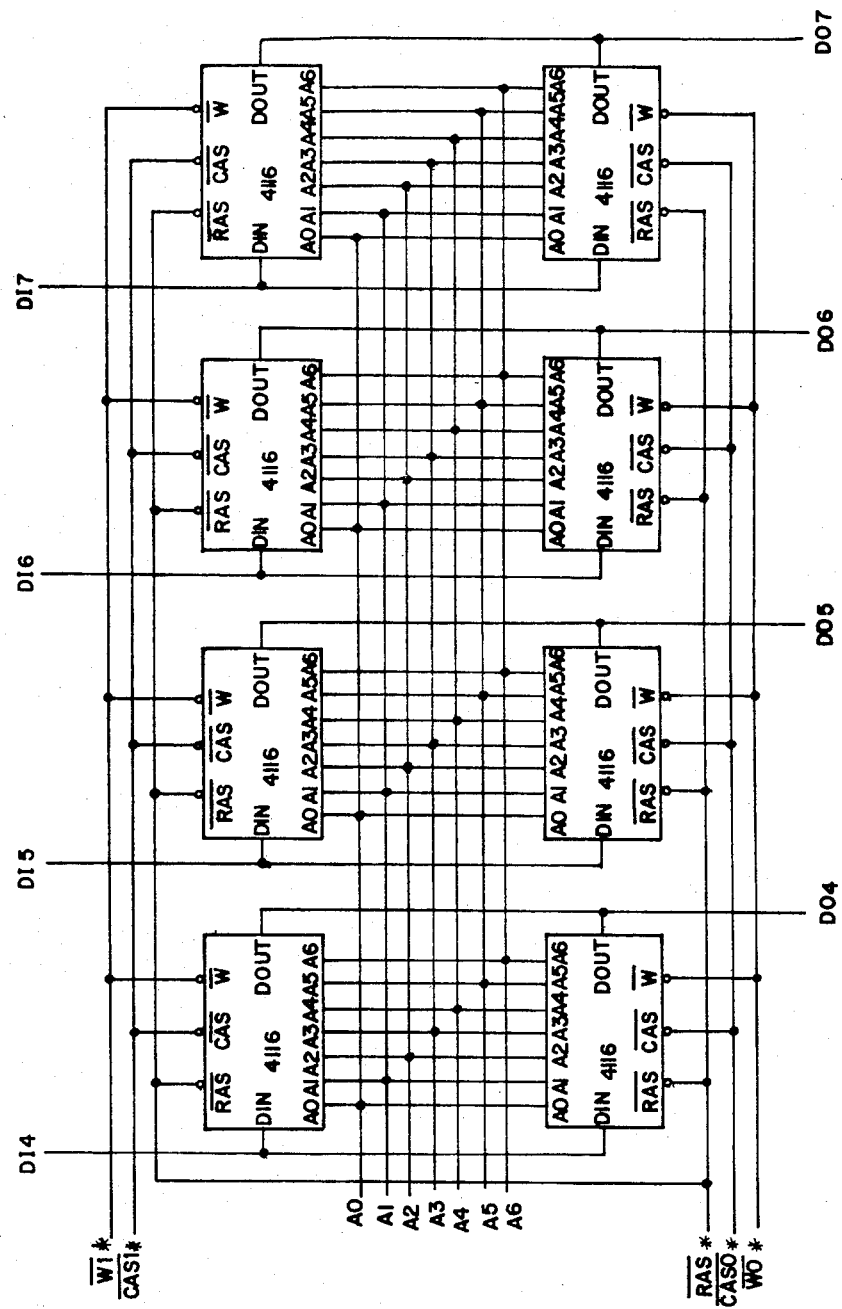
Figure 6F:
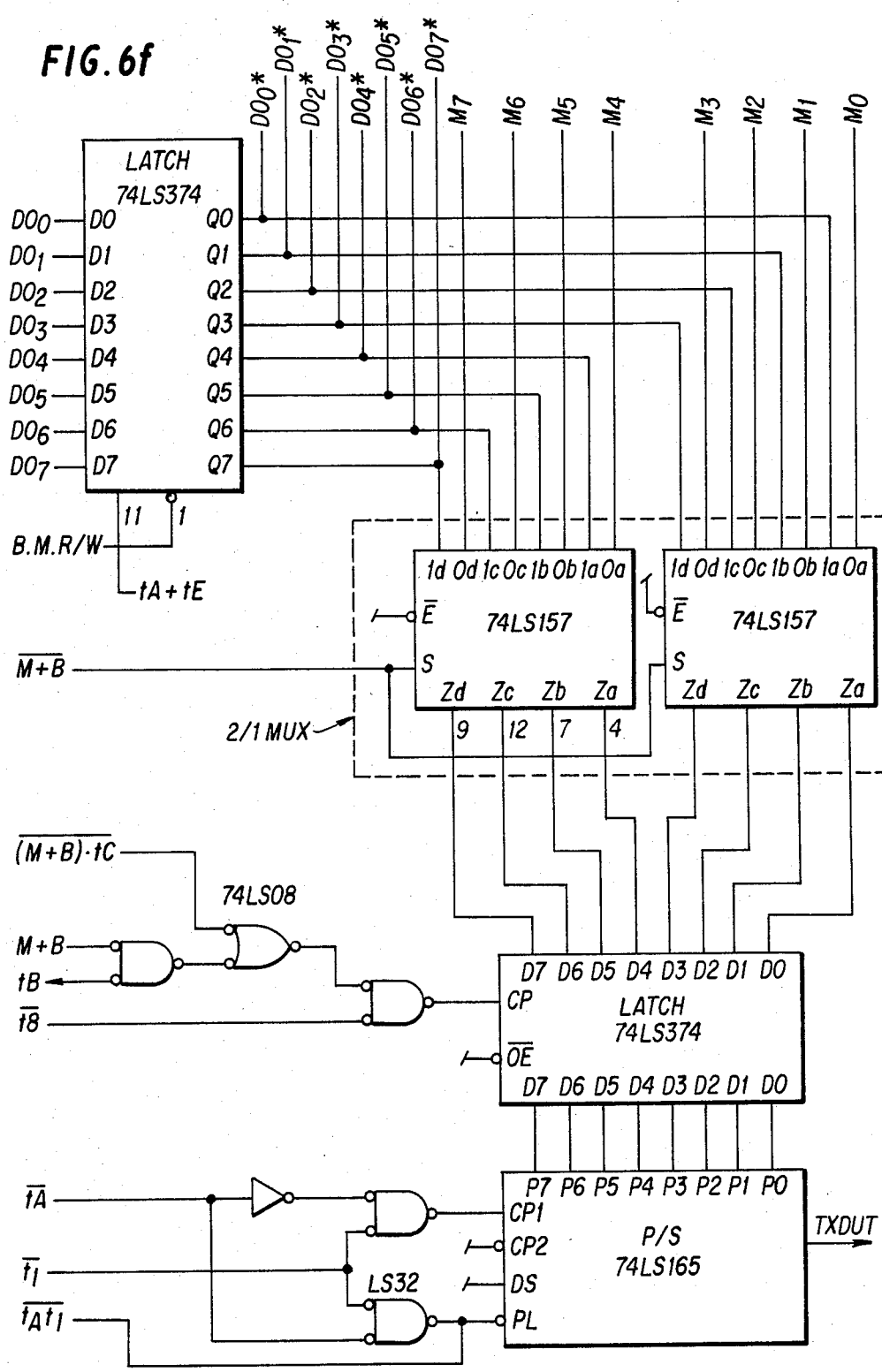
Figure 6G:
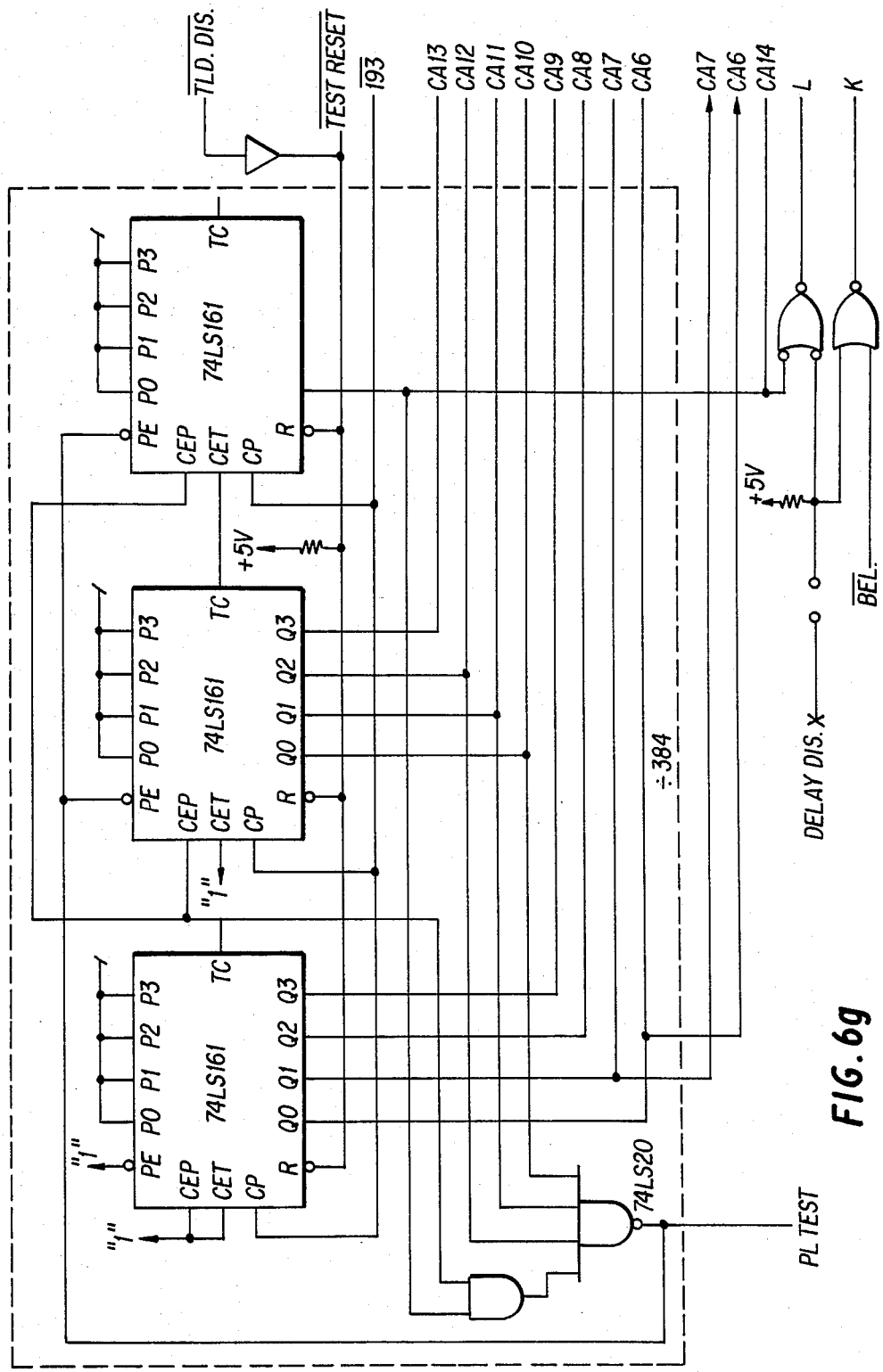
Figure 6H:
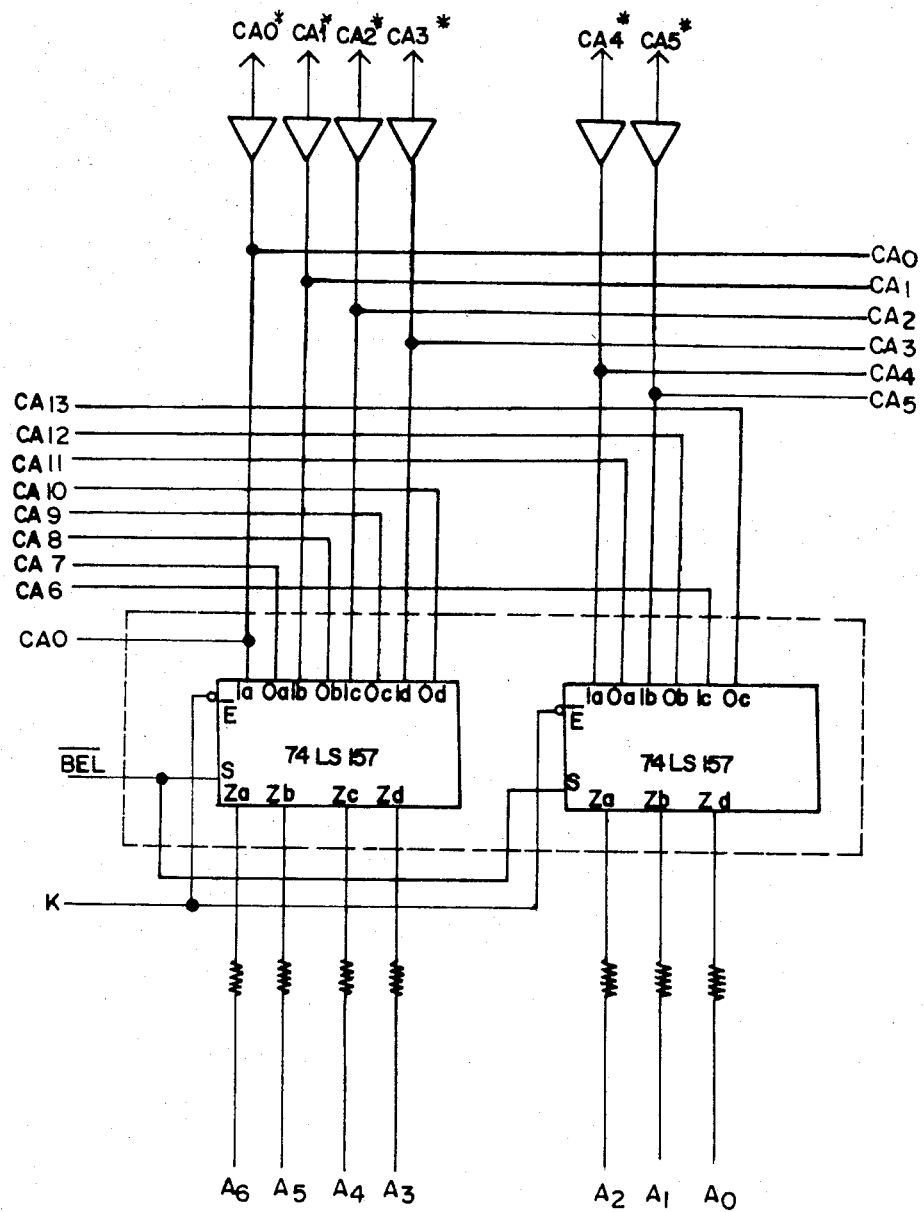
Figure 6I:
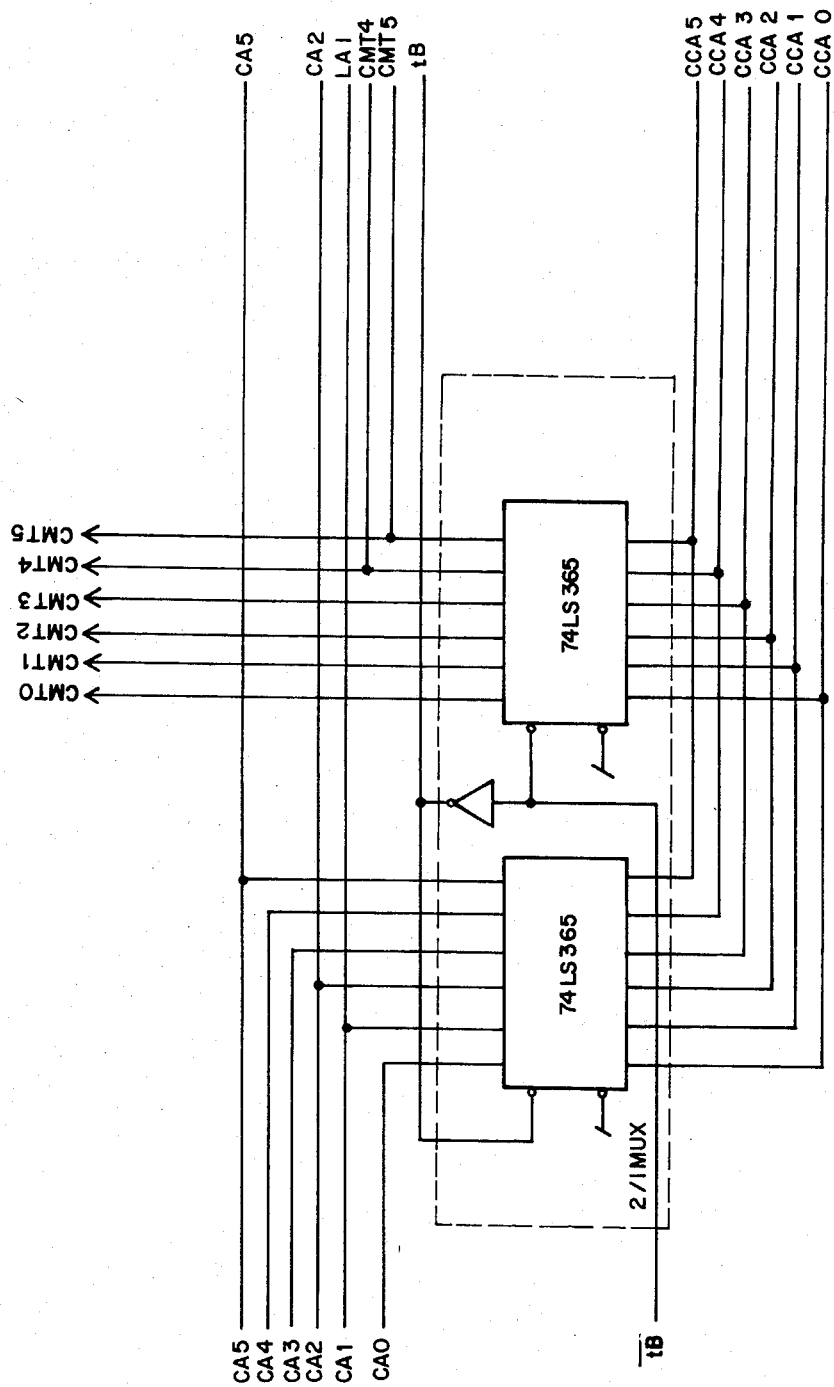
Figure 6J:
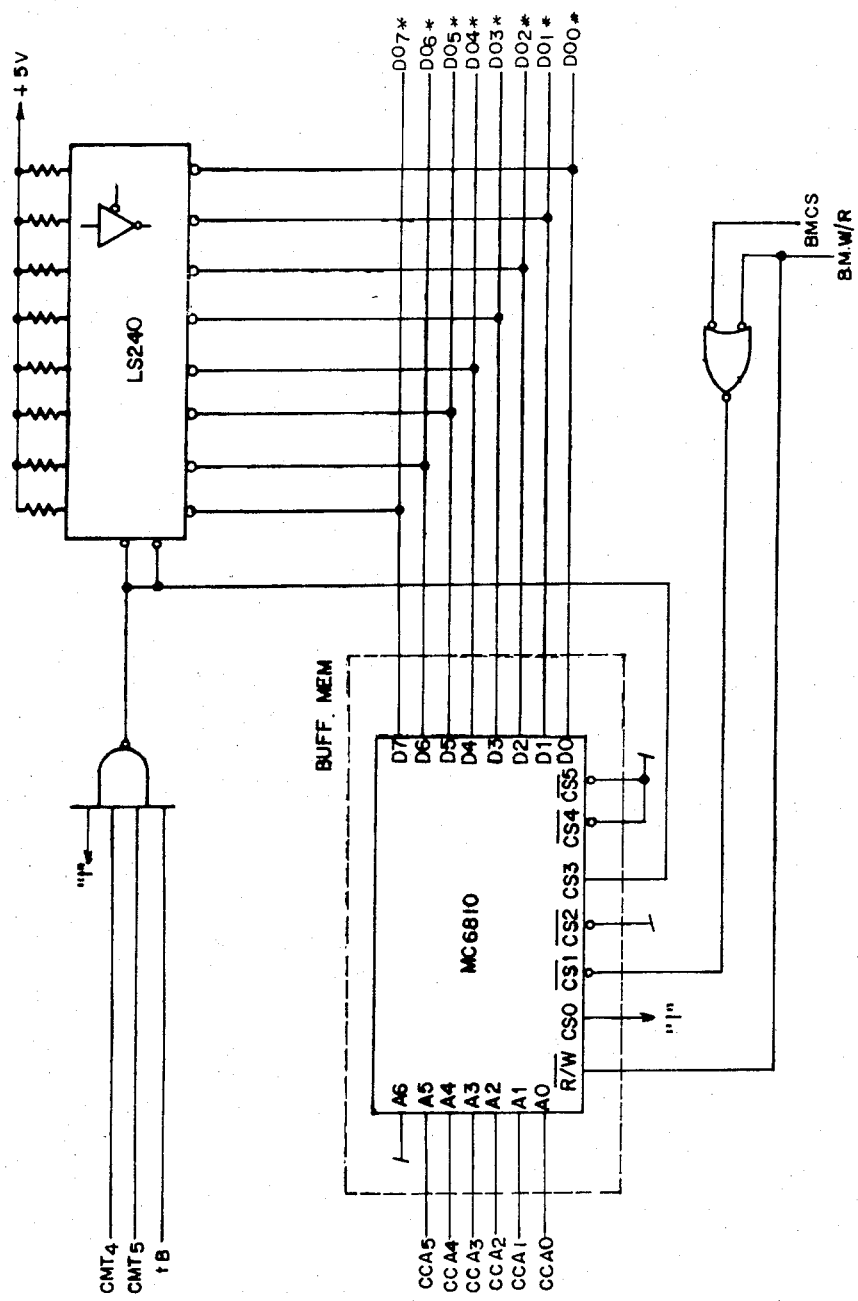
Figure 6K:
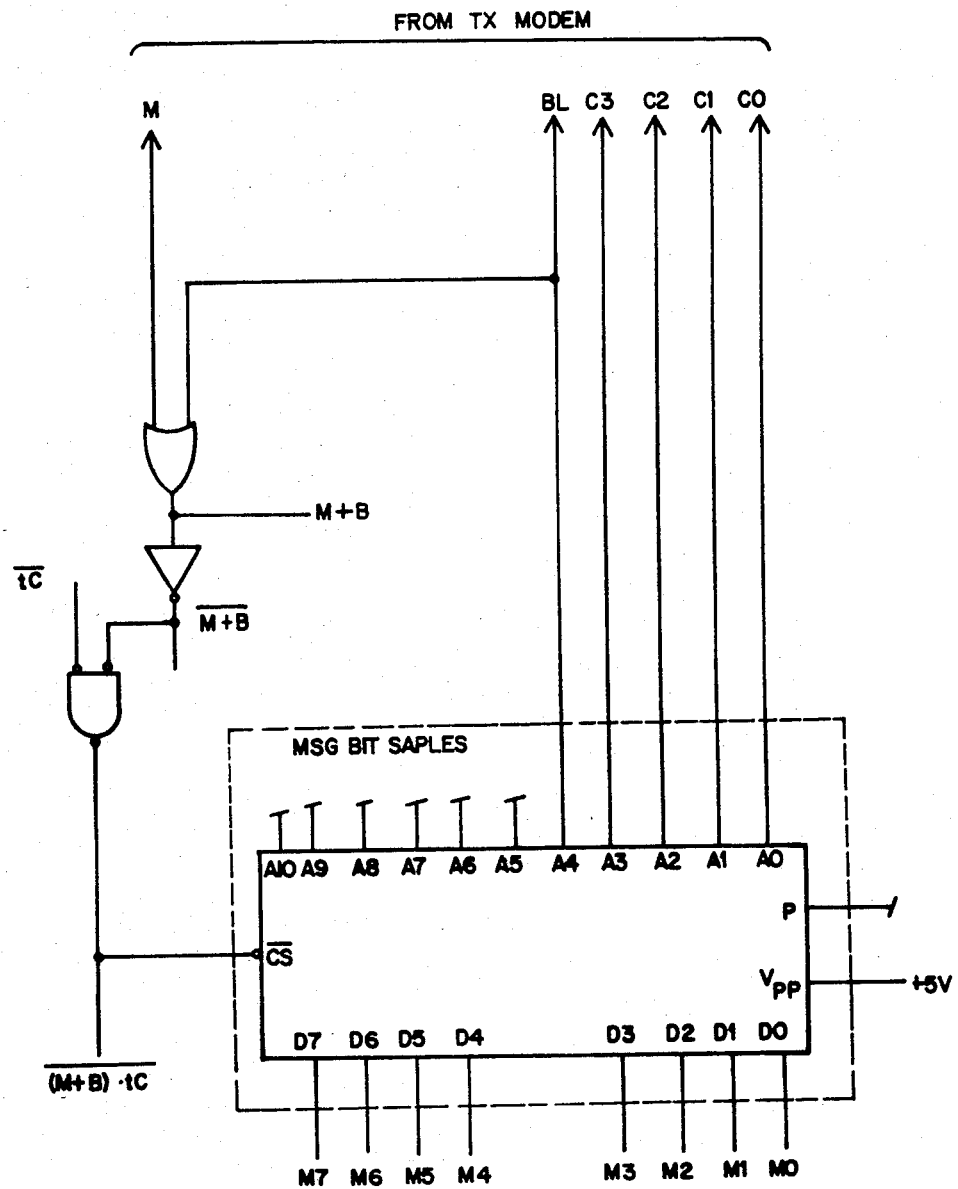
Figure 61:
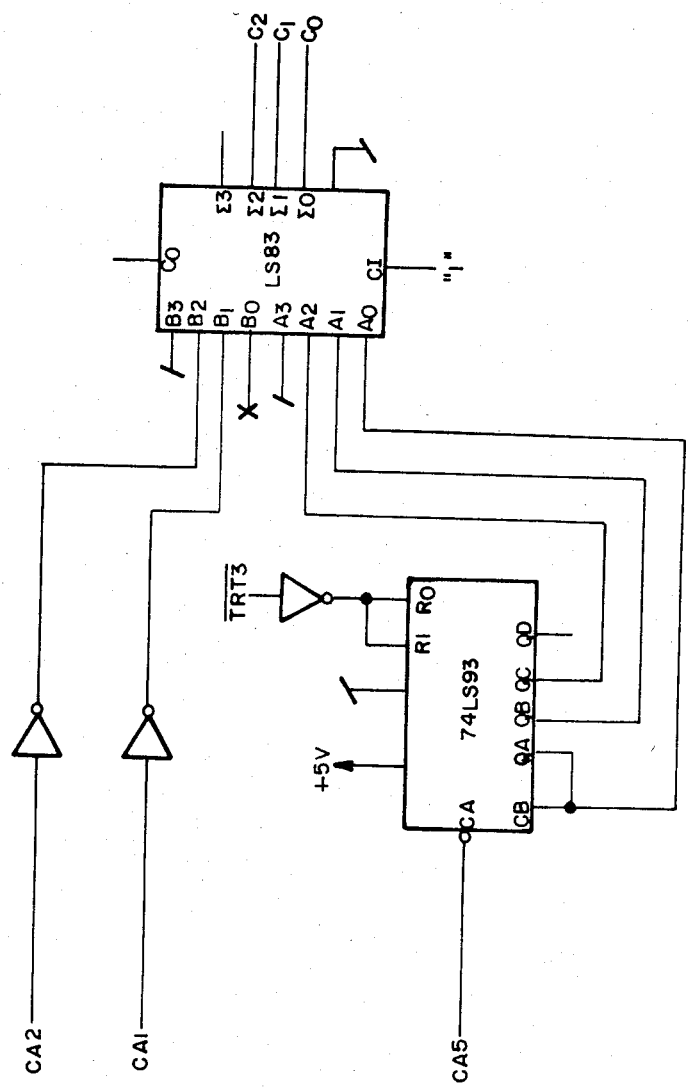
Figure 6M:
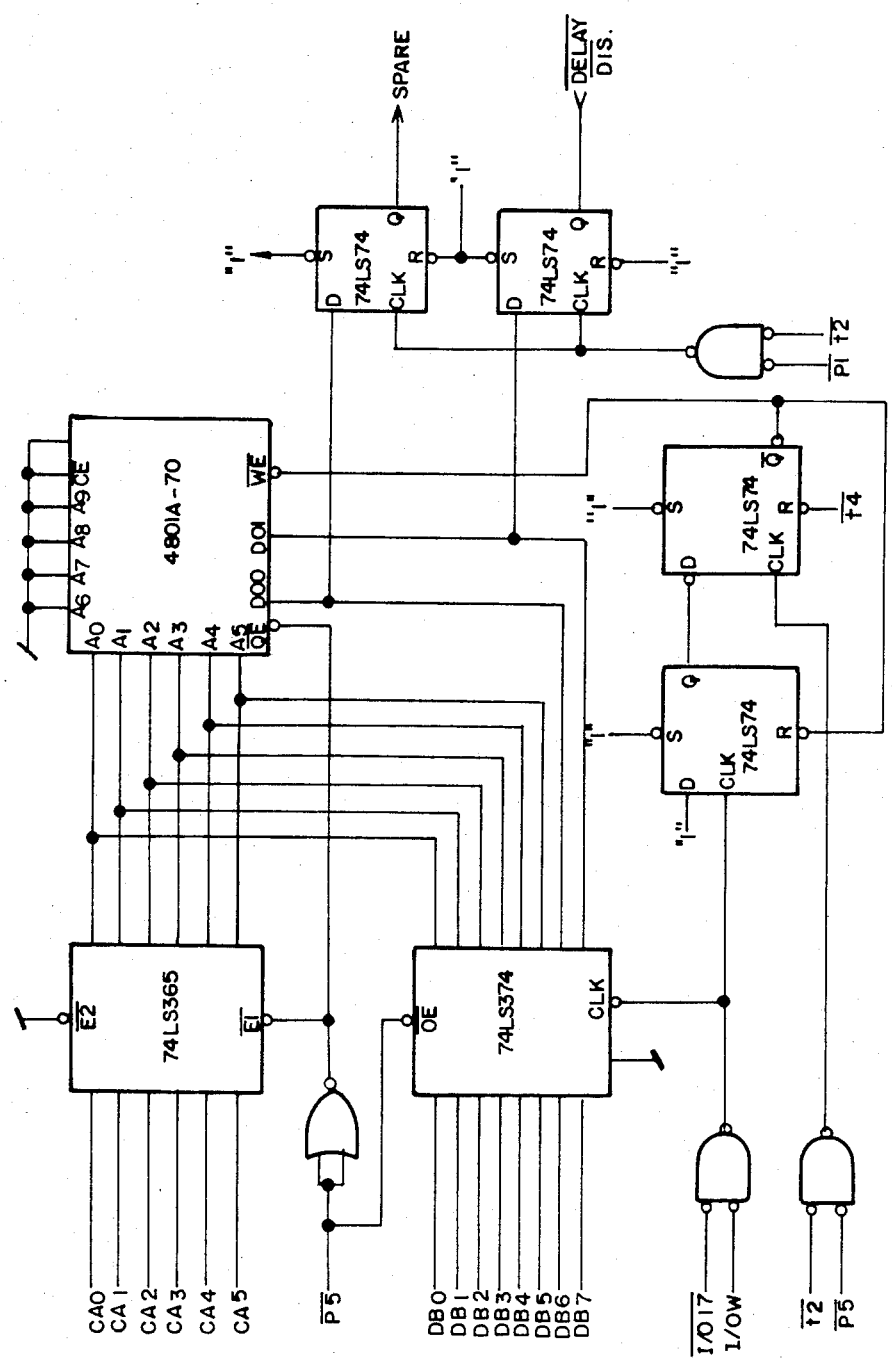
Figure 7A:
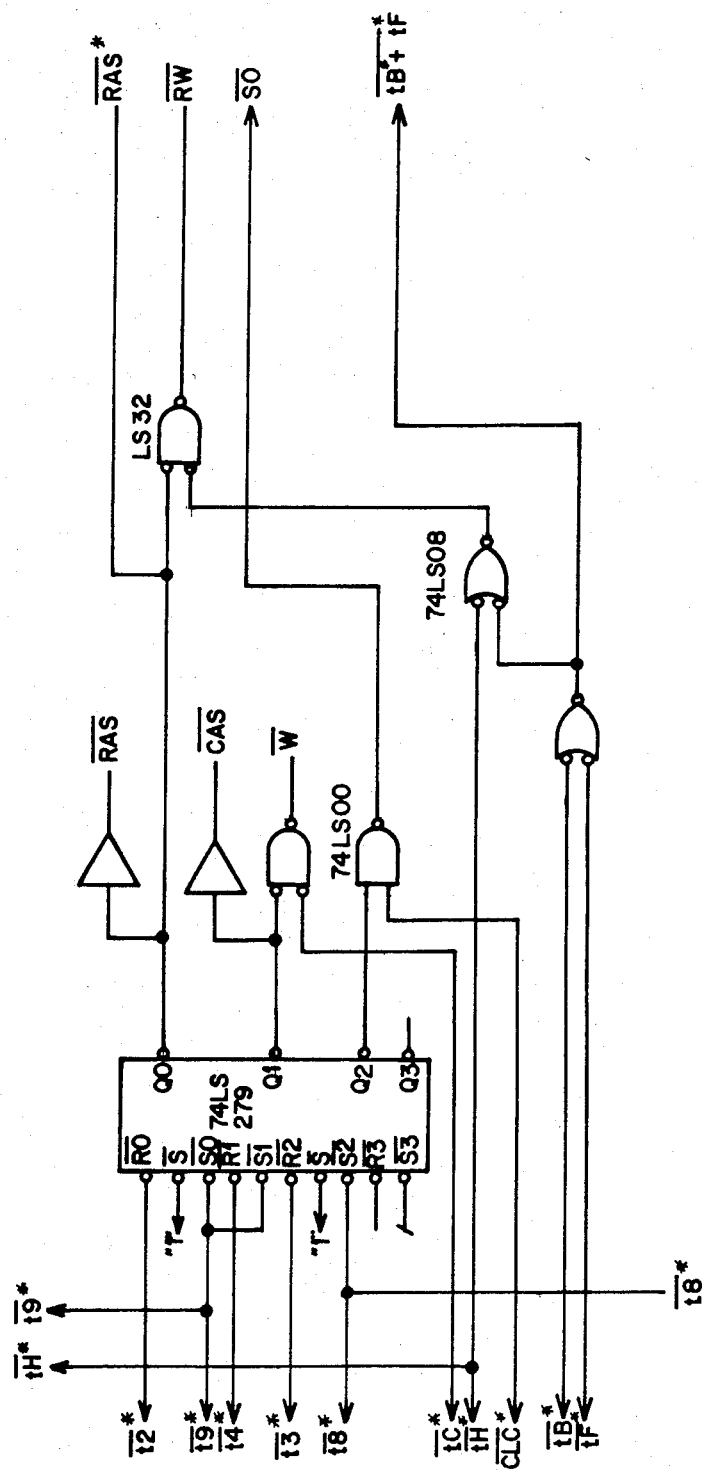
Figure 7B:
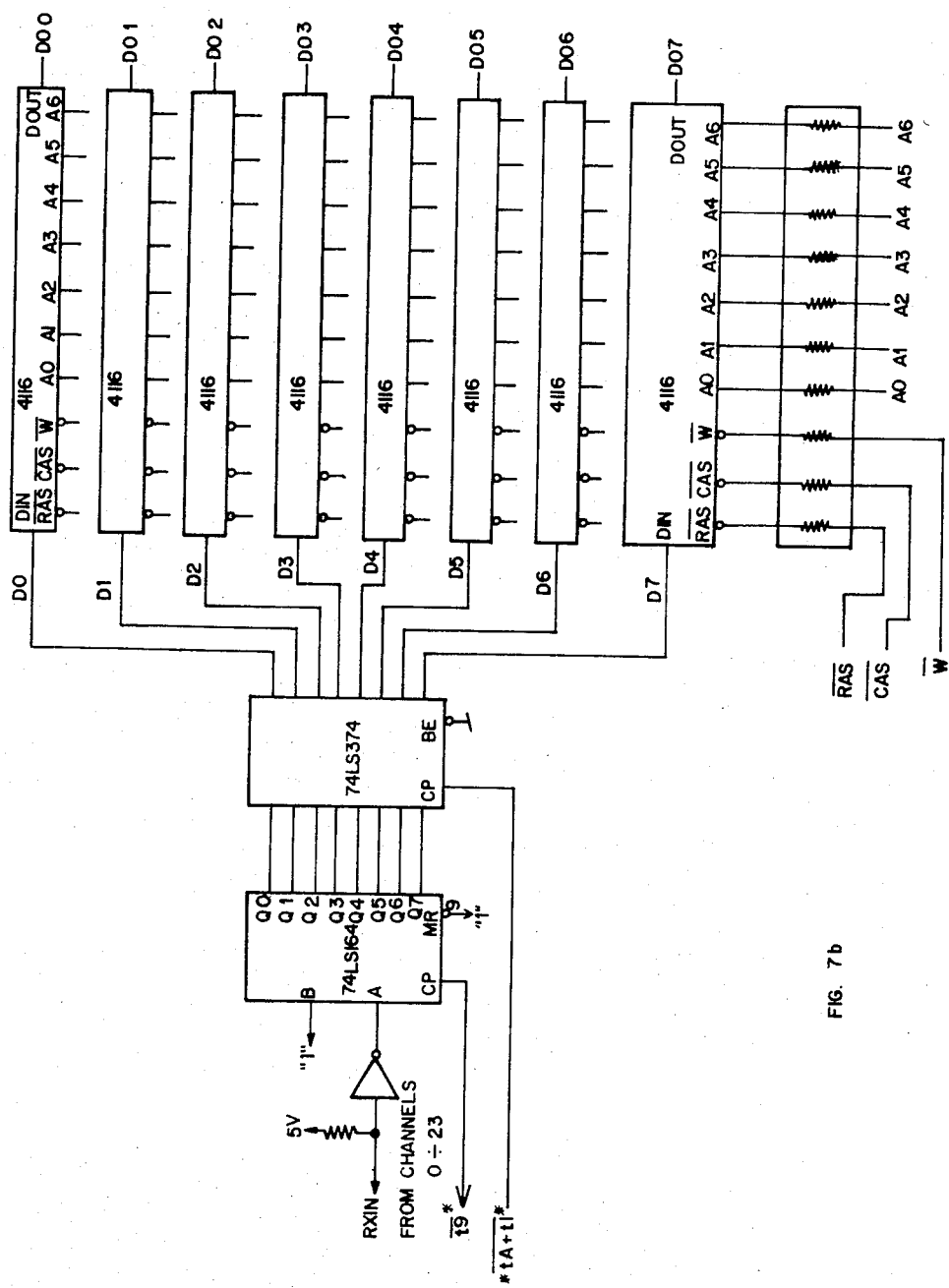
Figure 7C:
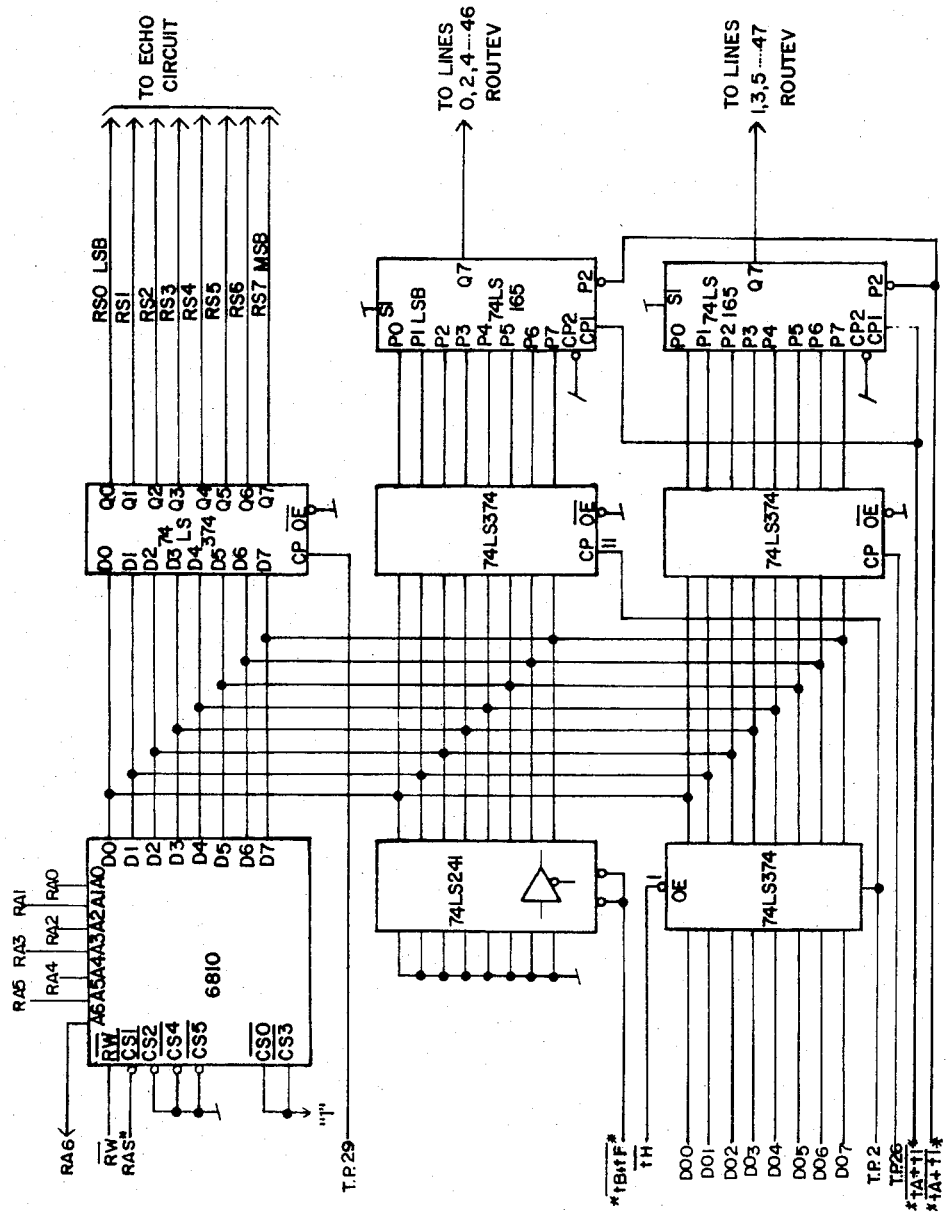
Figure 7D:
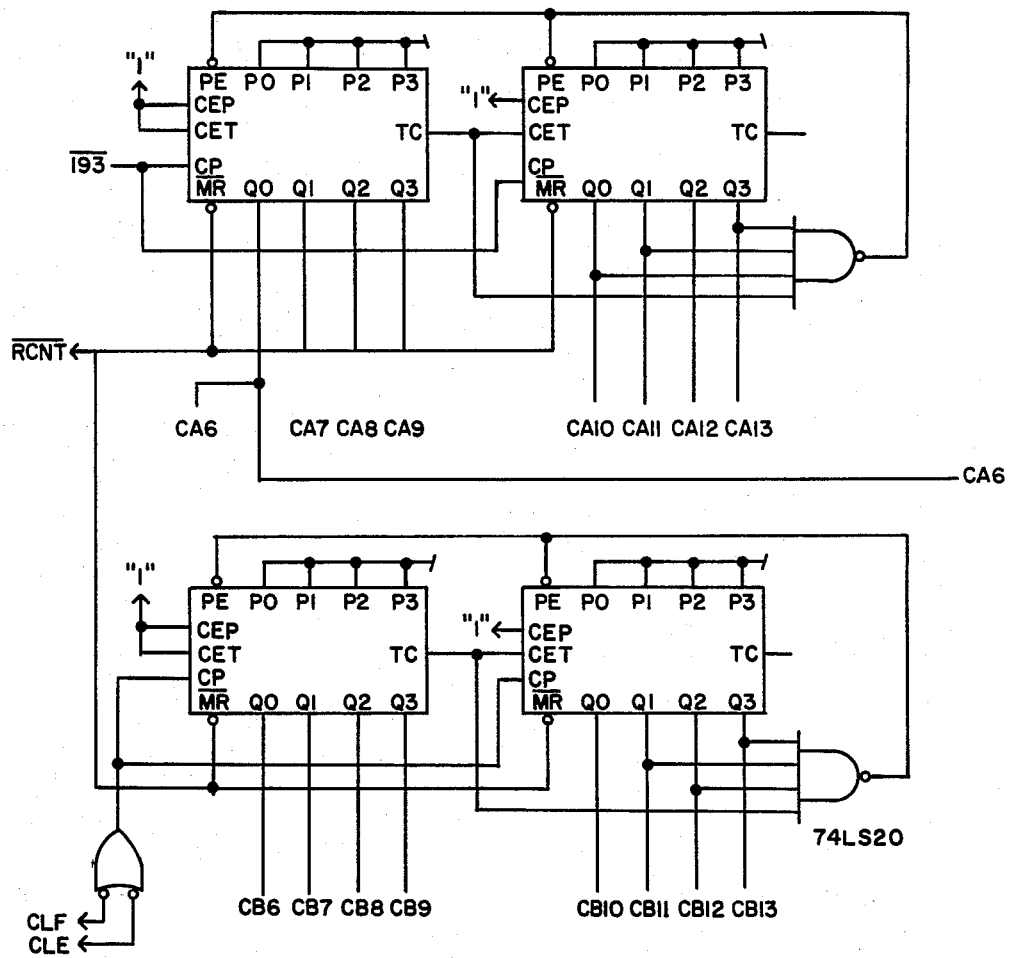
Figure 7E:
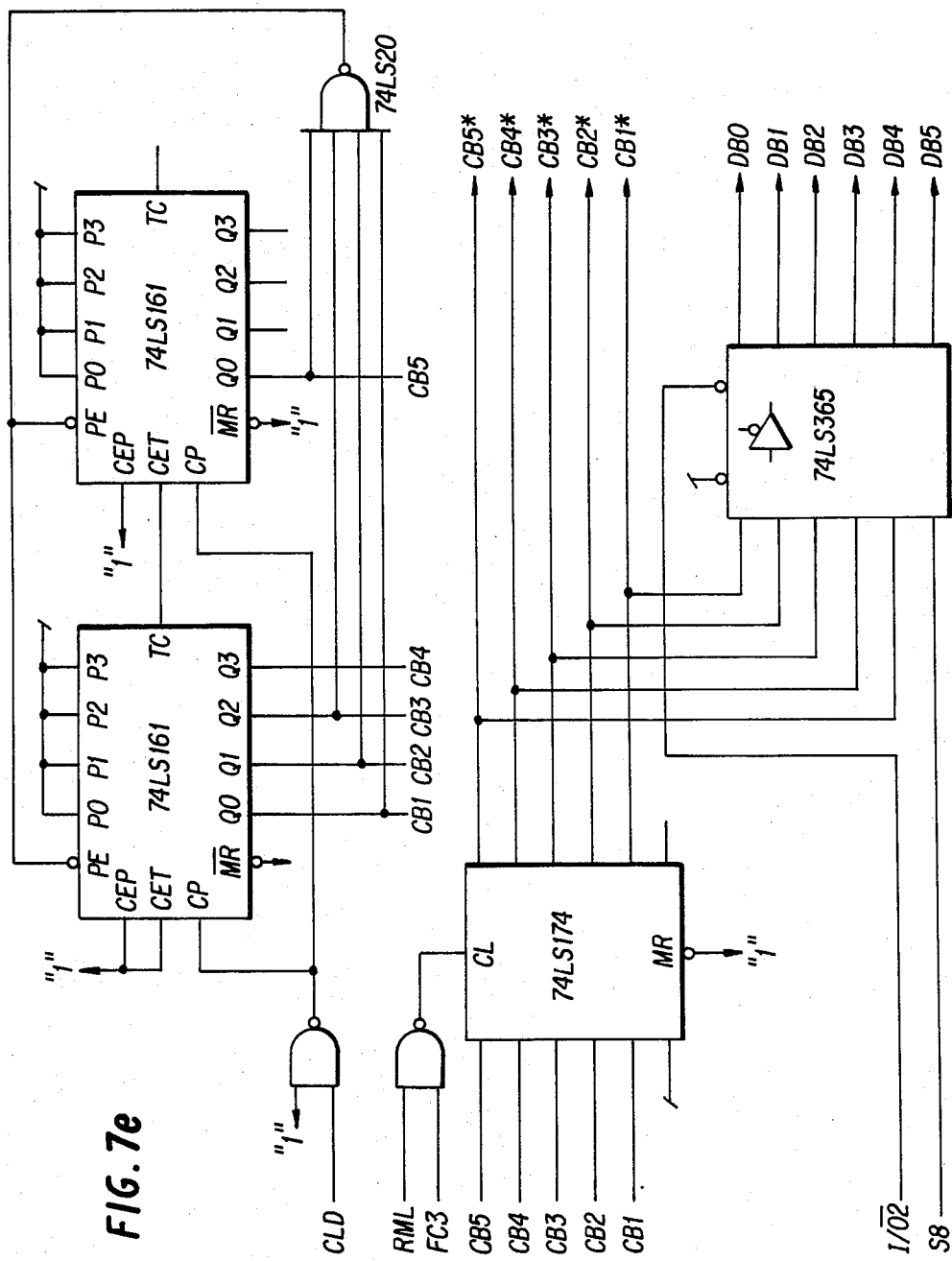
Figure 7F:
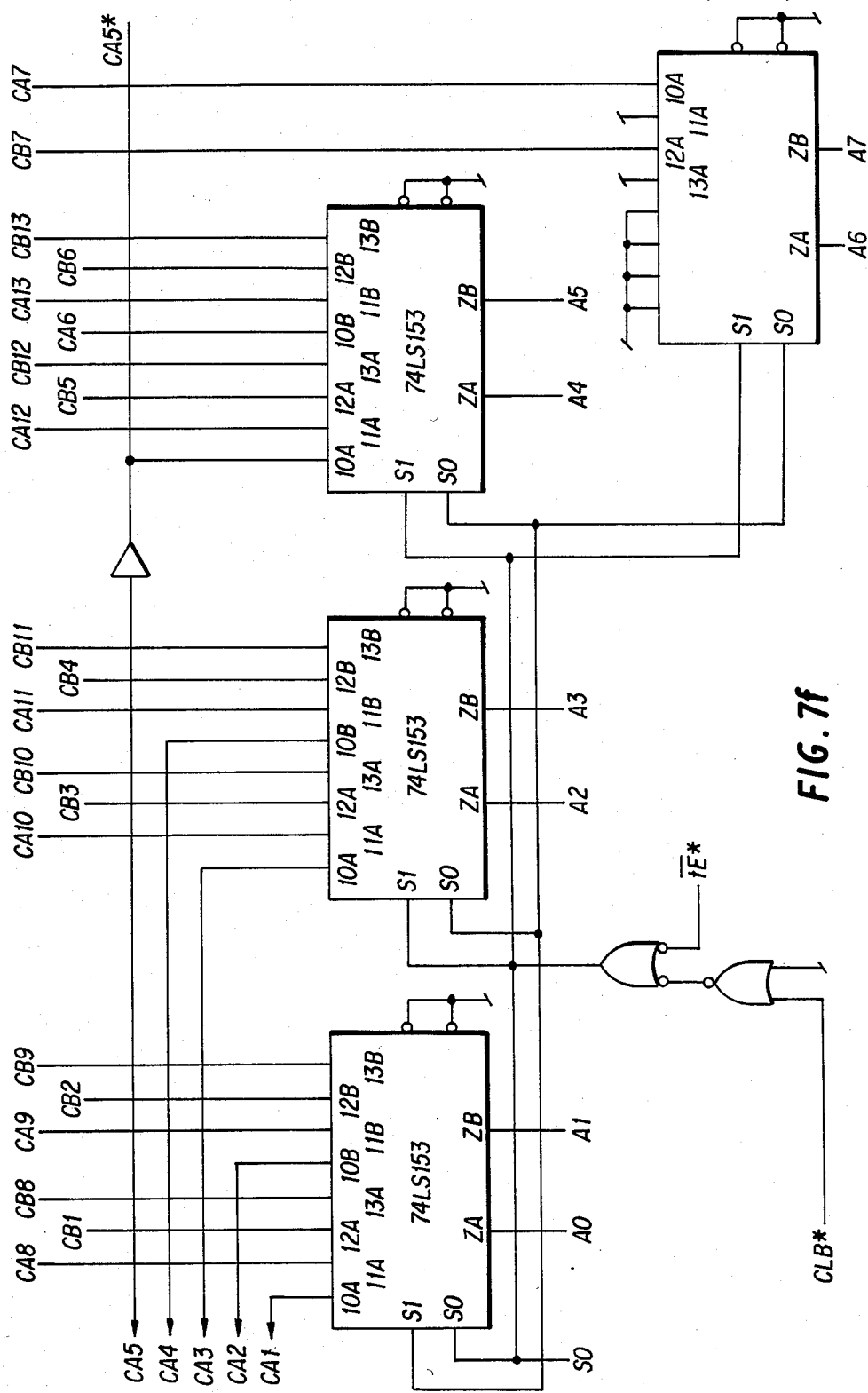
Figure 7G:
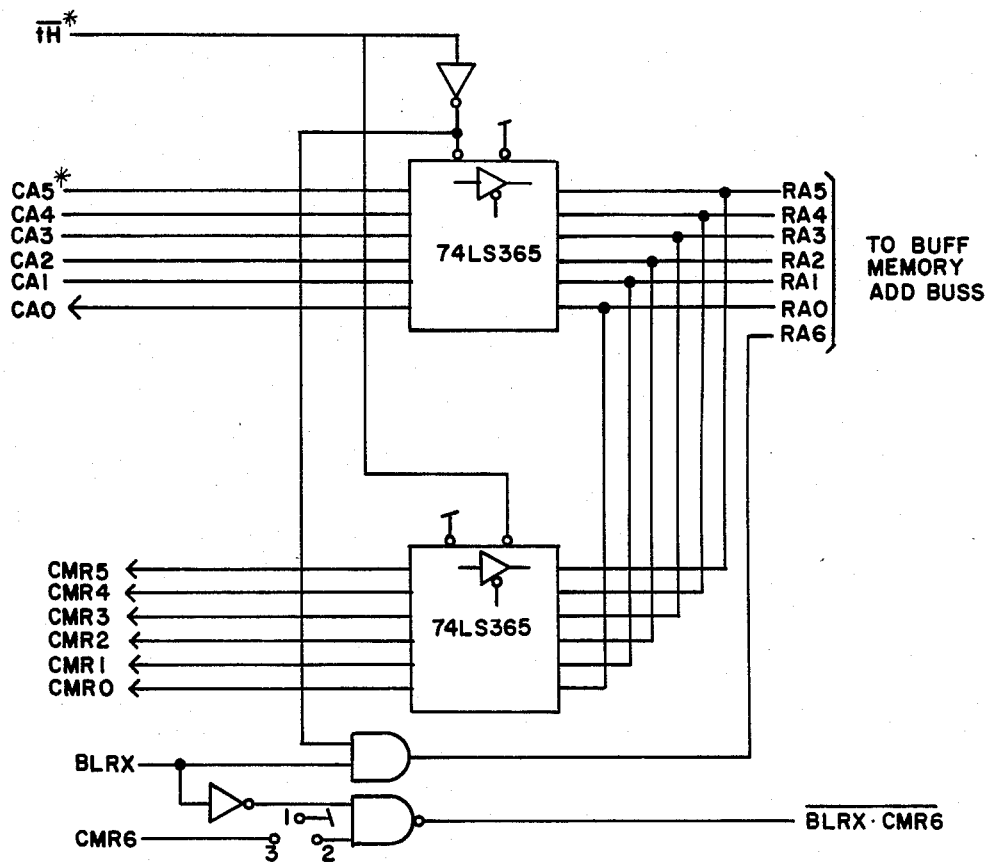

The operation of the $t_G$ timing signal may be appreciated from a consideration of FIG. 4 which includes a delay memory latch clock signal. Normally the clock pulse occurs at time $t_A t_8$, but when delay disable is indicated, it is shifted to $t_G t_8$ so as to follow the delay memory write enable signal which occurs at $t_C$.

Reference is now made to FIGS. 5–7 which are schematic illustrations of various parts of the circuitry illustrating the detailed exemplary implementation of the invention in the ECI circuitry which is disclosed and claimed in the aforesaid published European Patent Application.

Figure 1B:
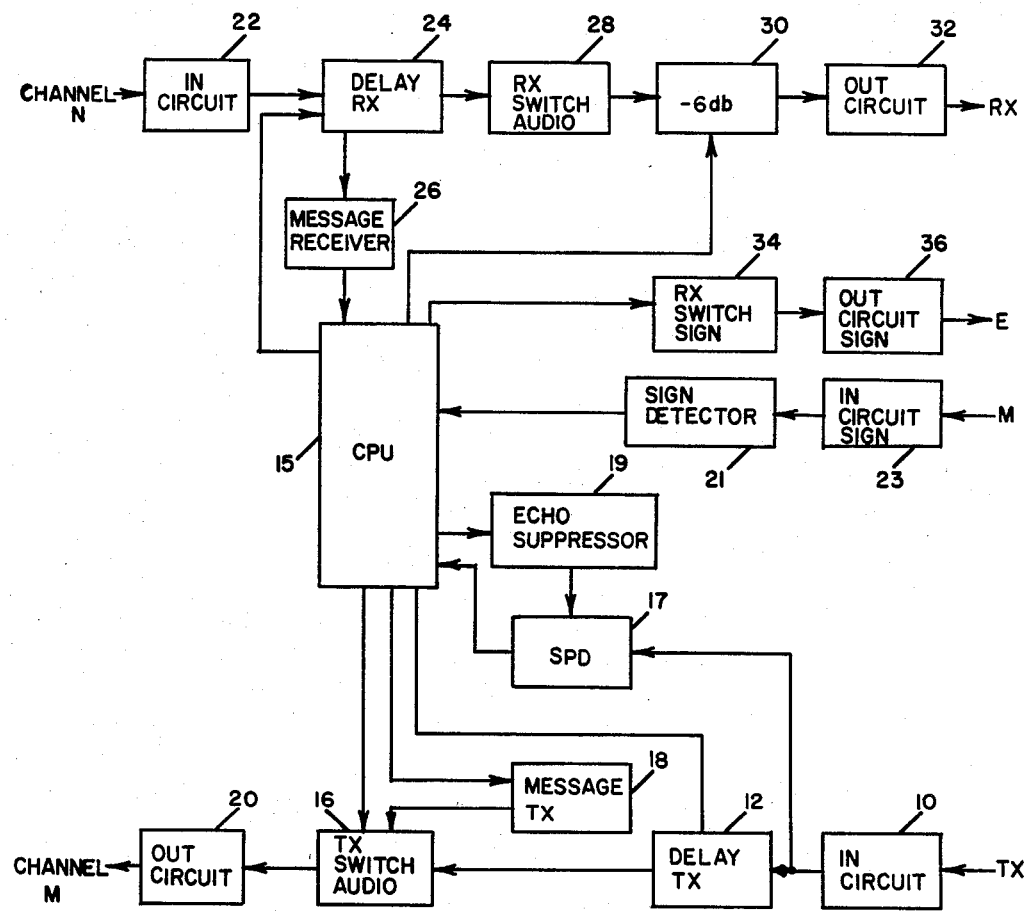
Figure 2A:
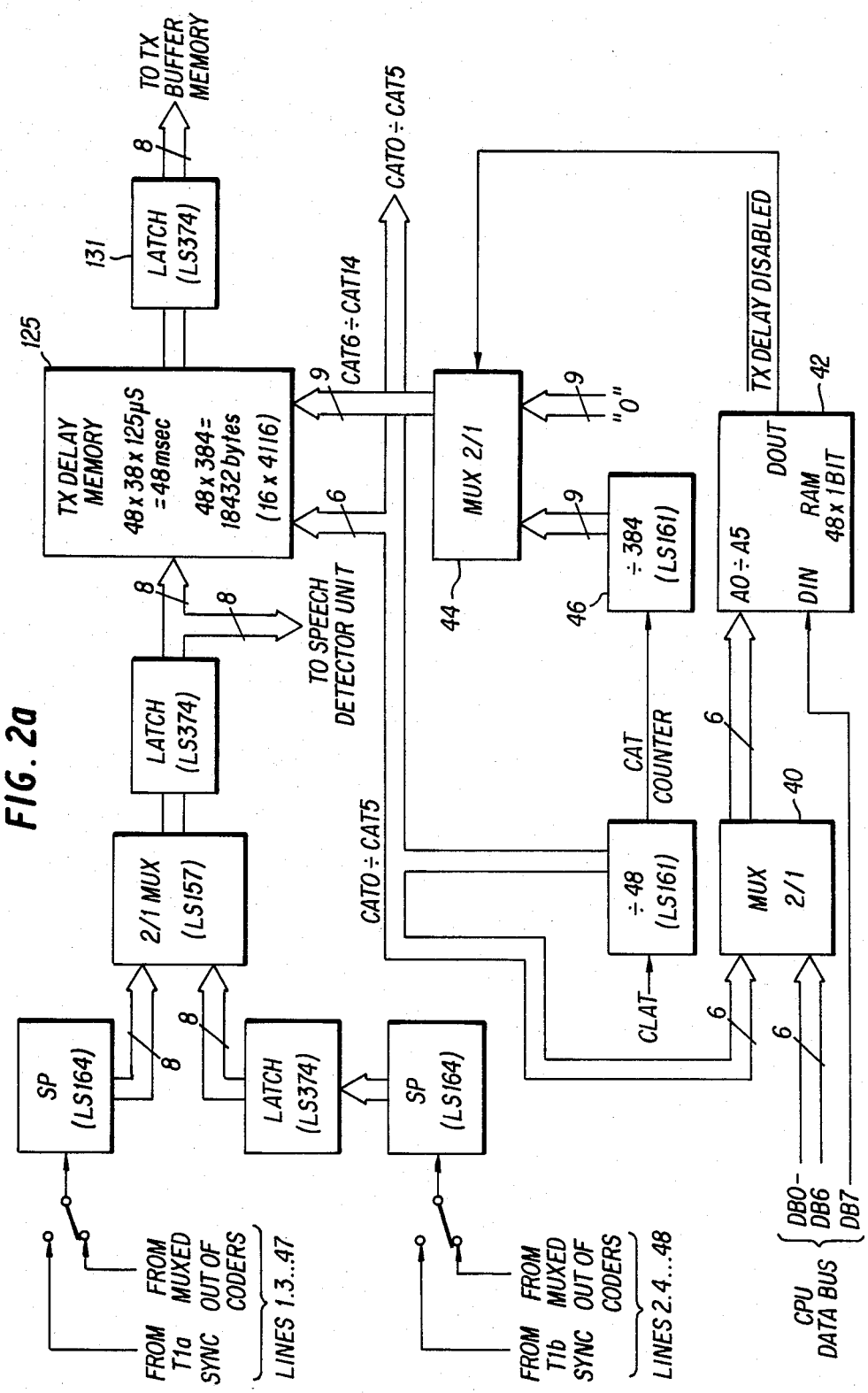
FIGS. 2a and 2b are block diagram illustrations of transmit speech flow circuitry forming part of the apparatus of FIGS. 1a and 1b.
Figure 2B:
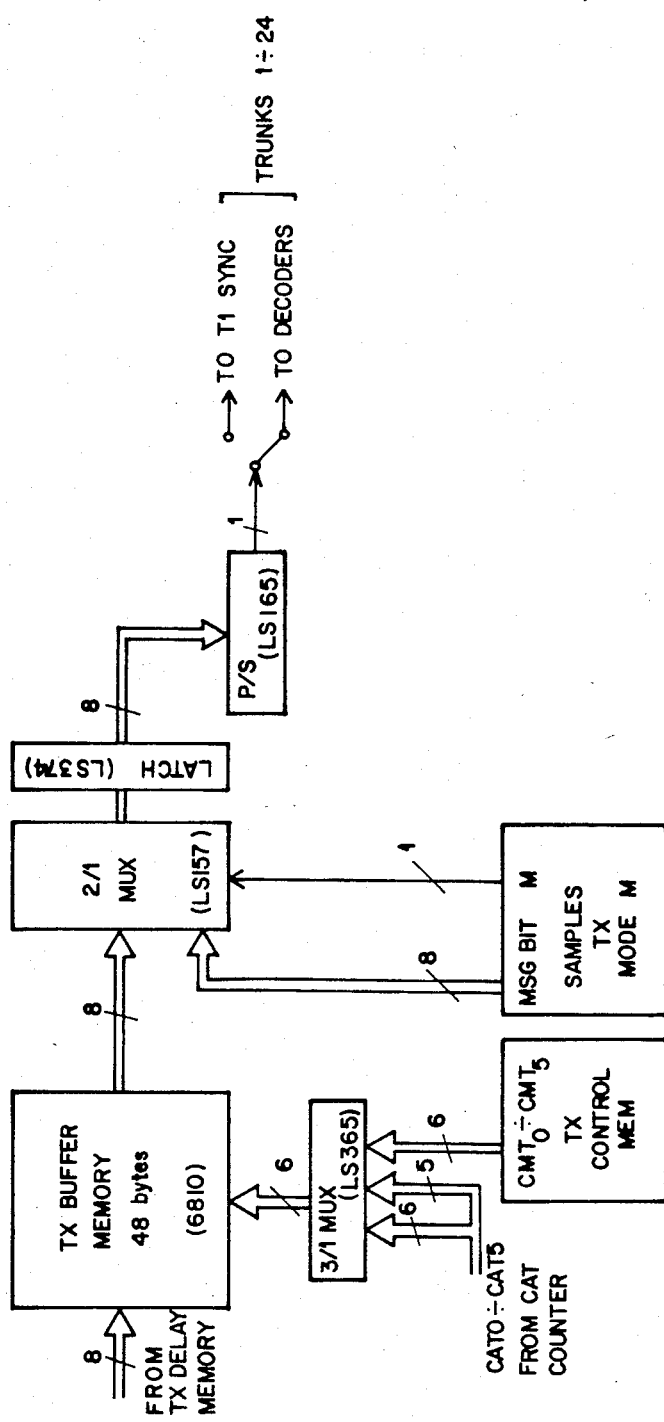

FIG. 5 is a schematic illustration of echo suppression circuitry forming part of the apparatus of FIGS. 1a and 1b. FIG. 6 illustrates the apparatus shown in FIGS. 2a and 2b in schematic form, while FIG. 7 is a schematic illustration of part of the circuitry shown in block diagram form in FIGS. 3a and 3b.

A computer listing for the operation of the CPU in the presence of interregister multifrequency signalling is provided hereinbelow:

```
   1  NAME R 2 DET
   2 $NOLIST
 543  $LIST
 544  DSEG
 545
 546  ;***    R2DET IS THE R-2 SIG. SYSTEM ROUTINE
 547  ;       IT CONSISTS OF 5 SUBROUTINES:
 548  ;                R2DET: IS THE ROUTINE WHICH DETECTS A SI
      GNALING PROTOCOL START
 549
 550  ;                R2DIO: IS THE ROUTINE WHICH INITIALIZES
      AN R-2 SIG. PROTOCOL
 551  ;                       BY ASSIGNING A TRUNK TO THE LINE
      AN RESETING THE APPROPRIATE
 552  ;                       TIMER (IN SKTMR TABLE)
 553
 554  ;                R2DLC: IS THE ROUTINE INVOKED BY A SP.
      ASSIGNMENT ACKNOWLEDGE FOR
 555  ;                       A TRUNK ASSIGNED TO R-2 PROTOCOL
      . IT RESETS THE APPROPRIATE
 556  ;                       TIMER AND CANCELS DELAY, ECHO. S
      UP AND 6-DB
 557
 558  ;                R2RXD: IS THE ROUTINE INVOKED BY A CANC
      EL DELAY MESSAGE SENT B OTHER
 559  ;                       END R2DLC AND SENDS AN LSD OFF I
      F ITS ON THE INITIATINGEND
 560
 561  ;                R2DLT: IS THE ROUTINE WHICH TERMINATES
      THGE R-2 PROTOCOL AFTER
```

```
542 ;                              THE APPROPRIATE TIMER HAS EXPIRE
    D
543
544 ;***     INPUT:  FOR ALL SUBROUTINES IS THE LINE INDEX IN
    B+C
545 ;***     OUTPUT:
566
567 PUBLIC   R2DET, R2D10, R2DLC, R2RXD, R2DLT
568
569 EXTRN    FISPO, QUEIX, QUEMS, MSSND
570
571 R2DET:   LXI      H,SKRT
572          DAD      B
573          MOV      A,M
574          ANI      80H        ;CHECK IF  E LINE WAS LSD ON PRE
    VIOUS TO CURRENT LSD OFF
575          JZ       EXIT       ; IF NOT THAN NOT A START OF R-2
576          MOV      A,M
577          ANI      7FH
578          MOV      M,A
579
580          LXI      H,SCMR
581          DAD      B
582          MOV      A,M
583          ANI      0C0H       ; CHECK IF M-LINE IS IDLE
584          MVI      E,0AH      ;INDICATE TO R2D10 (IF CALLED) A
    N INITIATING OFF R2
585          CPI      0C0H
586          LXI      H,R2INT
587          DAD      B
588          MVI      M,00H
589          JZ       R2D10      ; IF IT IS, THAN START AN R-2.
590
591 EXIT:    POP      H
592          INX      H
593          INX      H
594          INX      H
595          PCHL                ; RETURN TO POINT OF CALL+3
596
597
598 $EJECT
599
600 R2D10:   LXI      H,CRT
601          DAD      B
602          MOV      A,M        ; GET CURRENT ASSIGNMENT OF LINE
603          ANI      1FH
604          CPI      1FH        ; CHECK IF LINE ASSIGNED
605          JZ       NOTAS      ; IF NOT, GO ASSIGN.
606
607          PUSH     D          ; SAVE TIMER INTITIALIZATION VAL
    UE
608          MOV      E,A
609          MVI      D,0H
610          LXI      H,CUMLT    ; GET CURRENT STATUS OF TRUNK AS
    SIGNED TO LINE
611          DAD      D
612 ;        MOV      A,M
```

```
613 ;         INR     A           ; IF STATUS IS FFH THAN R-2 WAS
    INITIATED ALREADY
614          POP     D
615 ;        RZ
616
617          CALL    CHACK       ; CHECK IF SP ACKNOWLEDGE TIMER
    ACTIVE FOR RELEVANT TRUNK
618          JMP     NOTAS       ; IF ACTIVE TREAT AS NOT ASSIGNE
    D
619
620          PUSH    D           ; SAVE TIMER RESET VALUE
621          MOV     A,C         ; LINE INDEX IN ACC FOR FISPO
622          PUSH    B           ; SAVE LINE INDEX
623
624          LXI     H,SKTMR
625          DAD     B
626          MVI     M,0         ; CLEAR R-2 TIMER CORRESPONDING
    TO CURRENT LINE TO ENABLE FISPO FOR THIS LINE
627
628          CALL    FISPO       ;
629          POP     B           ; RESTORE LINE INDEX
630          POP     D           ; RESTORE TIMER REST VALUE
631
632          LXI     H,SKTMR
633          DAD     B           ; IN H+L ADR. OF R-2 TIMER CORRE
    SPONDIG TO CURRENT LINE
634          MOV     M,E         ; RESET TIMER
635          CALL    R2DLC       ; SINCE LINE WAS ASSIGNED CANCEL
    VARIOUS DELAYS
636          RET
637
638
639 NOTAS:   MOV     A,C         ; LINE INDEX IN ACC FOR FISPO
640          PUSH    B
641          PUSH    D
642
643          LXI     H,SKTMR
644          DAD     B
645          MVI     M,0         ; CLEAR R-2 TIMER CORRESPONDING
    TO CURRENT LINE TO ENABLE FISPO FOR THIS LINE
646
647          CALL    FISPO
648          POP     D
649          POP     B
650          LXI     H,SKTMR
651          DAD     B           ; IN H+L ADR. OF R-2 TIMER CORRE
    SPONDIG TO CURRENT LINE
652          MOV     M,E         ; RESET TIMER
653          RET
654
655 $EJECT
656
657
658 R2DLC:   LXI     H,CRT
659          DAD     B
660          MVI     A,1FH
661          ANA     M           ; GET INDEX OF TRUNK ASSIGNED TO
```

```
662         MOV     E,A
663         MVI     D,0
664         LXI     H,COMLT
665         DAD     D
666         MVI     M,OFFH    ; INDICATE ASSIGNED TRUNK NOT TO
     BE USED FOR ANY OTHE PURPOSE
667
668         MVI     A,80H
669         ORA     C
670         OUT     OE8H      ; CANCEL DELAY IN TX.
671         LXI     H,3000H
672         MVI     A,B1
673         ORA     C
674         MOV     M,A       ; ECHO DISABLE=ON, 6DB=OFF.
675
676         LXI     H,CMT
677         DAD     D         ; IN H+L ADR. OF CMT ENTRY CORRE
     SPONDING TO ASSIGNED TUNK
678         LXI     B,1255
679 R2D00:  DCX     B
680         DCR     B
681         INR     B
682         JZ      R2D01
683         MOV     A,M
684         ANI     OCOH      ; CHECK B&M BITS
685         ORA     A
686         JNZ     R2D00
687 R2D01:  LXI     H,R2INT
688         DAD     B
689         MOV     A,M
690         ORA     A
691         JM      NOMSG
692         MVI     A,OBOH    ; CREATE CANCEL DELAY MESSAGE
693         MOV     L,E       ; TRUNK INDEX IN L FOR MSSND
694         MVI     E,80H
695         CALL    MSSND
696         RET
697 NOMSG:  MVI     A,OB1H    ;CREATE CANCEL DELAY MSG. & PASS
     IVE SIDE
698         MOV     L,E       ;TRUNK INDEX IN L FOR MSSND
699         MVI     E,80H
700         CALL    MSSND
701         RET
702
703 $EJECT
704
705
706 R2RXD:  JMP     KADIM
707         LDA     LADLT
708         CMP     C
709         RZ
710         LDA     LASPD
711         CMP     C
712         RZ
713         LDA     LAMSG
714         CMP     C
715         RZ
716         MOV     A,C
```

```
717         STA     LAMSG
718 KADIM:  CPI     1
719         JZ      OVER2
720         LXI     H,R2INT
721         DAD     B
722         MVI     M,OFFH
723 OVER2:  MOV     E,A         ;SAVE THE MSG. IN E REG.
724         LXI     H,CMRI
725         DAD     B
726         MOV     A,M         ; GET SCMRI ENTRY CORRESPONDING
    TO CURRENT LINE
727         ORI     B1
728         MOV     M,A         ; CANCEL DELAY RX
729         ANI     NOT B1
730         MOV     C,A
731         LXI     H,R2INT
732         DAD     B           ;GET ENTRY OF CORRESPONDING INIT
    IATION LINE
733         MOV     A,M         ;TAKE THE CONTENTS FOR KNOWING H
    OW IS
734         ORA     A           ;INITIATIVE DATA DETECTION
735         JZ      S1INT       ;SIDE ONE INITIATE .SKIP ((R2-00
    )AND(R2INT=00))
736         MOV     A,E         ;LOAD ACC. WITH MSG.
737         ORA     A
738         JZ      S2INT       ;SIDE TWO INITIATE
739         JMP     LSDMG       ;NO SIDE INITIATE
740 S1INT:  MOV     A,E         ;PUT THE MSG.IN ACC
741         ORA     A
742         JZ      INIEN
743 S2INT:  LXI     H,SKTMR     ;SIDE TWO INITIATE
744         DAD     B           ; GET ENTRY OF R-2 TIMER CORRESP
    ONDING TO LINE
745         MVI     M,8         ;RESET TIMER
746         MVI     E,08H       ;
747         CALL    R2D10       ; RESPOND TO R-2 PROT. INITIATIO
748         LXI     H,LAMSG
749         MVI     M,OFFH
750         RET
751
752
753 INIEN:  LXI     H,SKTMR
754         DAD     B           ;GET ENTRY OF R-2 TIMER CORRESPO
    NDING TO LINE
755         MVI     M,08H       ; RESET TIMER
756 LSDMG:  MVI     E,0
757         LXI     H,SKRT      ;LOAD SIG. LINE CROSS REF. TABLE
758         DAD     B           ;GET ENTRY OF CURRENT LINE
759         MOV     A,M
760         ORA     A
761         JP      INIEP       ;LSD-OFF=19H (POSITIVE) REG. E=0
762         MVI     E,80        ;LSD-ON=99H (NEGATIVE) REG. E=80
    H
763 INIEP:  MVI     A,80
764         ORA     C           ; GENERATE LSD OFF MESSAGE
765         CALL    QUEMS       ; INSERT IN QUEUE
766         LXI     H,LAMSG
```

```
767             MVI     M,OFFH
768             RET
769             DS      20H
770 $EJECT
LINE         SOURCE STATEMENT
771
772
773 R2DLT:   LDA     MASKS
774          PUSH    PSW
775          DISAB   FIFMB+MSTMB
776+         DI                      ;DISABLE INTERRUPTS
777+         LDA MASKS               ; GET CURRENT MASK
778+         ORI FIFMB+MSTMB         ;INSERT BIT
779+         OUT SMASK               ;SET NEW MASK
780+         STA MASKS               ;SAVE NEW MASK
781+         EI
782          LXI     H,LADLT
783          MOV     M,C
784          LXI     H,CRT
785          DAD     B
786          MOV     A,M             ; GET ASSIGNMENT OF TERMINATED R
       -2 LINE
787          ANI     1FH
788          MOV     M,A             ; INDICATE LINE NOT ACTIVE
789          CPI     1FH             ; WAS IT ASSIGNED
D 790        JZ      WANOS           ; IF NOT SKIP NEXT
791
792          MOV     E,A
793          MVI     D,0
794          LXI     H,COMLT
795          DAD     D               ; GET STATUS OF ASSIGNED TRUNK
796          MOV     M,C             ; INDICATE TRUNK ASSIGNED TO LIN
       E
797          LXI     H,CMT
798          DAD     D               ; GET CMT ENTRY CORRESPONDING TO
       R-2 ASSIGNED TRUNK
799          MOV     A,M
800          XRI     CMTXX
801          ANI     0C0H
802          ORI     37H             ; DISCONNECT LINE FROM TRUNK
803          XRI     CMTXX
804          MOV     M,A
805
806
807          PUSH    B
808          LXI     H,CMRI+17H
809          MVI     B,17H
810 R2FND:   MOV     A,M
811          ANI     3FH
812          CMP     C               ; SEARCH FOR TRUNK ON WHICH LINE
       IS ASS. IN RX.
D 813        JZ      FOUND
814          DCX     H
815          DCR     B
LINE         SOURCE STATEMENT
816          JP      R2FND
817          POP     B
```

```
818              JMP     R2D50
819 FOUND:       POP     B
820              MOV     M,A
821              MOV     M,A      ; RESTORE DELAY IN RX CONT. MEM
    IMAGE
822              MVI     H,HBCMR
823              MOV     A,M
824              ANI     NOT R1
825              MOV     M,A      ; RESTORE DELAY IN RX
826
827 R2D50:       MOV     A,E      ; TRUNK INDEX IN ACC FOR QUEIX
828              PUSH    B
829              CALL    QUEIX    ; RETURN TRUNK TO FREE TRUNKS QU
    EUE
830              POP     B
831
832 WANOS:       LXI     H,SKTMR
833              DAD     B
834              MVI     M,0      ; DEACTIVATE R-2 TIMER CORRESPON
    DING TO LINE
835              MOV     A,C
836              OUT     0E8H     ; RESTORE DELAY IN TX.
837              STA     3000H    ;  SCHO DISABLE=OFF, 6DB=ON
838              ENABL   FIFMB+MSTMB
839+             DI
840+             LDA MASKS         ; GET CURRENT MASK
841+             ANI NOT FIFMB+MSTMB    ;CLEAR RELEVANT BITS
842+             MOV B,A           ;SAVE CURRENT MASK,RELEVANT BITS
    CLEARED.
843+             POP PSW           ;GET ORIGINAL MASK
844+             PUSH PSW          ;SAVE AGAIN
845+             ANI FIFMB+MSTMB   ;GET ORIGINAL STATUS OF RELEVANT
    BITS
846+             ORA B             ;RESTORE RELEVANT BITS
847+             OUT SMASK         ; SET NEW MASK
848+             STA MASKS         ; SAVE NEW MASK
849+             EI
850              POP     PSW
851              LXI     H,LADLT
852              MVI     M,0FFH
853              RET
854
855
856 CHACK:       PUSH    B
857              PUSH    D
858              MOV     C,A      ; SAVE TRUNK INDEX
859              LXI     H,EQUSP  ; GET ADR. OF SP. ACK QUEUE TAIL
LINE             SOURCE STATEMENT
    POINTER
860              LXI     D,QUSPA  ; GET ADR. OF QUEUE
861 CMPIX:       MOV     A,E
862              CMP     M        ; WAS END OF QUEUE REACHED
863              JZ      NOACK    ; IF REACHED NO ACTIVE ACKNOWLED
    GE
864              LDAX    D
865              CMP     C        ; IS THIS ENTRY THE REQUIRED TRU
    NK INDEX
```

```
866             JZ      ACKAC   ; IF IT IS, THAN AN ACTIVE TIMER
        EXISTS
867             INX     D
868             JMP     CMPIX
869
870  NOACK:     POP     D
871             POP     B
872             POP     H
873             INX     H
874             INX     H
875             INX     H       ; IF NO ACTIVE TIMER RETURN TO P
        OINT OF CALL+3
876             PCHL
877
878  ACKAC:     POP     D
879             POP     B
880             RET
881
882  END
```

NO ERRORS

The operation of the apparatus of the invention whose structure has been described hereinabove will now be described.

On the outgoing side, signal detector circuitry 21 is operative to detect a change in the status of the M signalling wire on an outgoing communication line from idle to seized.

The status of the E wire on the outgoing side is then checked by the receive signalling switch 34 in order to indicate the status of the M wire on the incoming side. If the M wire on the incoming side remains in the idle state, outgoing the message transmit circuitry 18 transmits an assignment message to the incoming circuitry message receiver 26. The outgoing CPU 14 then decouples the communication line on which the status change from idle to seized from speech detector control and does the same with a selected communication channel. The incoming message transmit circuit 18 transmits an acknowledge message to the outgoing side.

The outgoing side receives the acknowledge message at message receiver 26 and in response to CPU command, transmits a delay disable message to the incoming side. CPU 14 at the outgoing side is then operative to disable the transmit delay in circuitry 12, to disable the operation of echo suppressor 19 and to disable the 6 db attenuation circuitry 30.

Upon receipt of the delay disable message, the incoming side is operative to disable its receive delay in circuitry 24 and to commence a timing period of between four and eight seconds during which interregister multifrequency signalling takes place. The incoming side then sends an assignment message via its message transmit circuitry 18. The incoming CPU 15 then disables the corresponding communication line and communication channel from speech detector control.

Upon receiving the assignment message, the outgoing side sends an acknowledge message via message transmit circuitry 14. The incoming side is operative upon receive of the acknowledge message to send a delay disable message to the outgoing side and then to disable on the incoming side the transmit delay in circuitry 12, the echo suppressor 19 and the 6 db attenuation circuitry.

The outgoing side is operative in response to receipt of the delay disable message to disable the receive delay in the receive speech flow circuitry 24 on the outgoing side. The outgoing side CPU 14 then commences a timing period of between four and eight seconds during which interregister multifrequency signalling takes place. Following the commencement of this period, the CPU sends via the message transmit circuitry 18 a communication line idle signalling status message (LSD OFF) to the incoming side.

At the end of the timing period at both the incoming and outgoing sides, the transmit and receive delays, the echo suppressor and the -6 db attenuation on both sides are all enabled to permit time assignment speech interpolation of the speech which follows established of a connection.

It will be appreciated by persons skilled in the art that the invention is not limited to what has been particularly shown and described hereinabove. Rather the scope of the present invention is defined only by the claims which follow:

We claim:

1. TASI apparatus suitable for use with telephone networks employing interregister multifrequency signalling comprising:

transmission apparatus at a first end of a transmission trunk link having a first plurality of communication channels, said transmission apparatus including means for detecting signals on a second plurality of telephone communication lines and for assigning each telephone communication line on which signals are present to an available one of the first plurality of communication channels and means for applying a delay to the detected signal;

receiving apparatus at a second end of said transmission link including means for assigning each of said first plurality of communication channels carrying signals to a corresponding one of the second plurality of telephone communication lines in accordance with assignment information received from said transmission apparatus;

means for communicating messages including assignment information between said transmission apparatus and said receiving apparatus;

means for sensing the onset of interregister multifrequency signalling on said second plurality of telephone communication lines; and means for disabling said means for applying a delay to the detected signals in response to the sensed onset of interregister multifrequency signalling.

2. In TASI apparatus including:

transmission apparatus at a first end of a transmission trunk link having a first plurality of communication channels, said transmission apparatus including means for detecting signals on a second plurality of telephone communication lines and for assigning each telephone communication line on which signals are present to an available one of the first plurality of communication channels and means for applying a delay to the detected signals;

receiving apparatus at a second end of said transmission link including means for assigning each of said first plurality of communication channels carrying signals to a corresponding one of the second plurality of telephone communication lines in accordance with assignment information received from said transmission apparatus; and apparatus for communicating messages including assignment information between said transmission apparatus and said receiving apparatus;

apparatus for rendering TASI useful with telephone networks employing interregister multifrequency signalling comprising:

means for sensing the onset of interregister multifrequency signalling on said second plurality of telephone communication lines; and means for disabling said means for applying a delay to the detected signals in response to the sensed onset of interregister multifrequency signalling.

3. Apparatus according to either of claims 1 and 2 and wherein said TASI apparatus also comprises means for applying a delay to said received signals and wherein said apparatus also comprises means for disabling said means for applying a delay to said received signals, in response to the sensed onset of interregister multifrequency signalling.

4. Apparatus according to claim 1 and wherein there is also provided in association with said TASI apparatus echo suppression means and attenuation means and wherein said apparatus also comprises means for disabling said echo suppression means and said attenuation means in response to the sensed onset of interregister multifrequency signalling.

5. Apparatus according to claim 2 and wherein there is also provided in association with said TASI apparatus echo suppression means and attenuation means and wherein said apparatus also comprises means for disabling said echo suppression means and said attenuation means in response to the sensed onset of interregister multifrequency signalling.

6. Apparatus according to claim 4 and wherein said echo suppression means and attenuation means forms part of said TASI apparatus.

7. Apparatus according to claim 5 and wherein said echo suppression means and attenuation means forms part of said TASI apparatus.

8. TASI apparatus suitable for use with telephone networks employing interregister multifrequency signalling comprising:

transmission apparatus at a first end of a transmission trunk link having a first plurality of communication channels, said transmission apparatus including means for detecting signals on a second plurality of telephone communication lines and for assigning each telephone communication line on which signals are present to an available one of the first plurality of communication channels and means for applying a delay to the detected signals;

receiving apparatus at a second end of said transmission link including means for assigning each of said first plurality of communication channels carrying signals to a corresponding one of the second plurality of telephone communication lines in accordance with assignment information received from said transmission apparatus, echo suppression means, attenuation means and means for applying a delay to said received signals, means for communicating messages including assignment information between said transmission apparatus and said receiving apparatus;

means for sensing the onset of interregister multifrequency signalling on said second plurality of telephone communication lines; and means for disabling at least one of the following group in response to the sensed onset of interregister multifrequency signalling, said group including said means for applying a delay to the detected signals, said echo suppression means, said attenuation means and said means for applying a delay to said received signals.

9. In TASI apparatus including:

transmission apparatus at a first end of a transmission trunk link having a first plurality of communication channels, said transmission apparatus including means for detecting signals on a second plurality of telephone communication lines and for assigning each telephone communication line on which signals are present to an available one of the first plurality of communication channels and means for applying a delay to the detected signals;

receiving apparatus at a second end of said transmission link including means for assigning each of said first plurality of communication channels carrying signals to a corresponding one of the second plurality of telephone communication lines in accordance with assignment information received from said transmission apparatus, echo suppression means, attenuation means and means for applying a delay to said received signals; and apparatus for communicating messages including assignment information between said transmission apparatus and said receiving apparatus;

apparatus for rendering TASI apparatus useful with telephone networks employing interregister multifrequency signalling comprising:

means for sensing the onset of interregister multifrequency signalling on said second plurality of telephone communication lines; and means for disabling at least one of the following group in response to the sensed onset of interregister multifrequency signalling, said group including said means for applying a delay to the detected signals, said echo suppression means, said attenuation means and said means for applying a delay to said received signals.

10. Apparatus according to either of the preceding claims 8 and 9 and wherein said means for disabling are operative for disabling at least two of said group.

11. Apparatus according to claim 8 and wherein said interregister multifrequency signalling comprises fully compelled interregister multifrequency signalling.

12. Apparatus according to either of claims 8 and 9 and wherein said means for disabling are operative for disabling said entire group.

13. Apparatus according to any of claims 1, 2 and 9 and wherein said means for disabling include means for disabling the means for applying a delay to the detected signals comprising means for disabling the operation of a delay memory for communication lines along with interregister multifrequency signalling is sensed to be imminent.

14. Apparatus according to any of claims 1, 2 and 9 and wherein said means for disabling includes means for disabling the means for applying a delay to the received signals comprising means for providing immediate readout of the contents of a delay memory into a latch before onset of the delay for communication channels along which interregister multifrequency signalling is sensed to be imminent.

15. Apparatus according to any of claims 1, 2 and 9 and wherein said TASI apparatus includes transmission and receiving apparatus at both ends of said transmission trunk link.

* * * * *

UNITED STATES PATENT AND TRADEMARK OFFICE
CERTIFICATE OF CORRECTION

PATENT NO. : 4,506,359

DATED : March 19, 1985

INVENTOR(S) : Henquin et al.

It is certified that error appears in the above-identified patent and that said Letters Patent is hereby corrected as shown below:

On the title page;

Correct the name of the second inventor as follows:

[75] Inventors: Teodor Henquin, Kiron; Ya'acov Ben Zeev, Ramat Gan, both of Israel Signed and Sealed this Twenty-second Day of October 1985

[SEAL]

Attest:

DONALD J. QUIGG

Attesting Officer

Commissioner of Patents and Trademarks—Designate